United States Patent

[11] 3,625,949

[72] Inventors Gustav Schorre;
 Herbert Nowak, both of Darmstadt,
 Germany
[21] Appl. No. 735,182
[22] Filed June 7, 1968
[45] Patented Dec. 7, 1971
[73] Assignee E. Merck A. G.
 Darmstadt, Germany
[32] Priorities June 8, 1967
[33] Germany
[31] M 74311;
 Apr. 18, 1968, Germany, No. P 17 70
 222.6

[54] SULFUR-CONTAINING DERIVATIVES OF 2-METHYL-4-HYDROXYMETHYL-5-METHYLENE-PYRIDINE
8 Claims, No Drawings
[52] U.S. Cl..................................................... 260/294.8,
 260/247.1, 260/243, 260/268, 260/293.4,
 424/246, 424/248, 424/250, 424/266, 424/267
[51] Int. Cl.......................................................C07d 31/48,
 C07d 31/50
[50] Field of Search........................................... 260/294.8
 F, 294.8

[56] References Cited
UNITED STATES PATENTS
3,010,966 11/1961 Zima et al...................... 260/294.8

Primary Examiner—Alan L. Rotman
Attorney—I. William Millen

ABSTRACT: For increasing the tolerance of animals to a deficiency of oxygen, compounds of the formula:

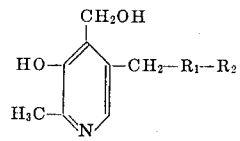

wherein $R_1$ represents $-S-$ or

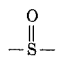

and $R_2$ represents lower acyl

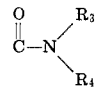

lower unsaturated alkyl, unsubstituted alkyl and substituted alkyl; with the provision that when $R_1$ represents $-S-$ $R_2$ is other than ethyl β-chloroethyl or β-hydroxyethyl.

SULFUR-CONTAINING DERIVATIVES OF 2-METHYL-4-HYDROXYMETHYL-5-METHYLENE-PYRIDINE

This invention relates to a group of novel sulfur-containing pyridine derivatives and in particular to compounds suitable for improving animal tolerance to states of oxygen deficiency and the like.

Particular aspects of this invention, therefore, are to provide novel chemical compounds as well as processes and intermediates for their manufacture.

Additional aspects comprise pharmaceutical compositions based on the compounds of this invention, and also methods of administering same to animals.

Upon further study of the specification and appended claims, other aspects and advantages of this invention will become apparent.

Regarding the novel chemical compounds of this invention, they include compounds of Formula I and pharmaceutically acceptable acid addition salts thereof. Formula I is as follows:

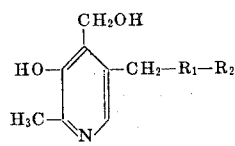

wherein $R_1$ represents —S— or

and $R_2$ represents lower acyl,

lower unsaturated alkyl, or alkyl optionally substituted by halogen, OH, lower alkoxy, SH, lower alkylthio, optionally functionally modified carboxy and/or

with the provision that, if $R_1$=—S—, $R_2$ represents a residue other than ethyl, β-chloroethyl or β-hydroxyethyl; and wherein $R_3$ and $R_4$, being identical or different, represent H or lower alkyl residues, which can also be combined to form a 5- or 6-membered alkylene chain optionally containing one or more hetero atoms of N, O or S.

The compounds of formula I and salts thereof are pharmacologically efficacious. In particular, they improve the tolerance of animals to oxygen deficiency. For example, in experiments on rats, the test animals were subjected to a subatmospheric pressure corresponding to an altitude of about 12,000 meters, and then the electroencephalogram of the test animals was continuously recorded by way of three lead wires attached to the scalp. After the intraperitoneal administration of 100 mg. of a compound of formula I or salt thereof, for example, 2-methyl-3-hydroxy-4-hydroxymethyl-5-methylthiomethyl-pyridine, the electroencephalogram is compared. This procedure was repeated on seven successive days, and it was discovered that animals treated in this manner exhibited a marked improvement in their tolerance to diminished oxygen concentrations. It is particularly noteworthy that the increased tolerance shows up immediately after injection, whereas in a comparative experiment with identical dosages of the conventional compound bis-[2-methyl-3-hydroxy-4-hydroxymethyl-pyridyl-(5)-methyl]-disulfide employed for the same purpose, no such immediate effect can be attained. Several compounds embraced by the above Formula I exhibit a physiologically protective effect against high intensity radiation. For example, compounds of Formula I, which contain the radical

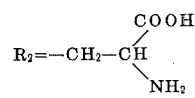

and salts thereof show such a protective effect.

Additionally, the compounds of formula I and salts thereof are useful to treat the types of pathological conditions often treated with the known bis-(3-hydroxy-4-hydroxymethyl-2-methyl-pyridyl-(5)-methyl)-disulfide.

The compounds according to the present invention may be administered for the following indications:

Organic psychic syndromes in regressive processes; nervous exhaustion and insufficiency during the involution period, neurasthenic syndromes of constitutional origin, "executive" disease; posttraumatic craniocerebral disorders, apoplexy, encephalitis and intoxications (especially in chronic alcoholism). Parkinsonism. Mental and psychic retardation of development during childhood. For interval therapy of migraine and long term therapy of idiopathic trigeminal neuralgia.

As further compared to the above-mentioned known drug, bis-[2-methyl-3-hydroxy-4-hydroxymethyl-pyridyl-(5)-methyl]-disulfide, the compounds of this invention are distinguished by the fact that the solubility thereof in water and/or lipoids can be varied by tailoring the residue $R_2$ both with respect to the length of chain and the choice of more or less polar substituents. For example, compared to the known disulfide, the compound 2-methyl-3-hydroxy-4-hydroxymethyl-5-methylthiomethyl-pyridine of this invention is ten times more soluble in water, and the compound 2-methyl-3-hydroxy-4-hydroxymethyl-5-methylsulfinylmethyl-pyridine is 100 times more soluble in water.

Compounds of the above-mentioned formula I substituted in the residue $R_2$ by amino and/or carboxy groups exhibit the additional advantage that they are water-soluble in the physiological pH-range, i.e., pH 5 to 8, thus being particularly suitable for the preparation of injection solutions. In contradistinction thereto, the above-mentioned known disulfide in insoluble in water within the physiological pH-range.

Compounds of the aforementioned formula I containing longer alkyl residues in the $R_2$ residue are distinguished, as compared to the conventional disulfide, by increased lipoid solubility. These compounds can penetrate cell membranes relatively rapidly and are more satisfactorily absorbed by the lipoid-rich nerve tissue.

To prepare the above-mentioned compounds of formula I and the salts thereof, several alternative processes can be employed as follows:

a. liberating a free hydroxy group and optionally free amino groups from a starting compound of Formula II or the salts thereof

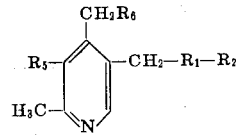

wherein $R_5$ and $R_6$, being identical or different, represent a free or functionally modified OH group with the provision that at least one of $R_5$ and $R_6$ represents a functionally modified OH group; and $R_1$ and $R_2$ have the above-indicated meanings, and wherein, undesired functionally modified OH 2amino groups are optionally contained in the residue $R_2$;

b. a 5-thiomethyl-pyridine derivative of the following formula III or a salt thereof is reacted with an alkylating or acylating agent:

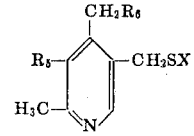

wherein $R_5$ and $R_6$, being identical or different, represent OH groups which are optionally functionally modified; and X represents H or an alkali or alkaline earth metal cation, preferably $Na^{\oplus}$, or an optionally substituted alkyl, aryl or aralkyl residue, or an undesired acyl residue, or the residue

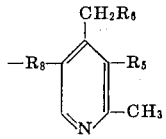

wherein $R_8$ is —CH$_2$— or —S—CH$_2$;

c. a pyridine derivative of the formula IV or a salt thereof

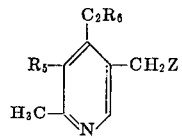   IV wherein

Z represents a sulfonic acid residue, particularly p-toluenesulfonyloxy; halogen, preferably Cl or Br; or the residue

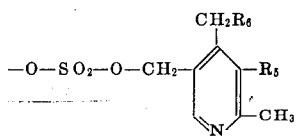

and $R_5$ and $R_6$ have the meanings set forth for formula III, is reacted with a mercapto compound of formula V

YS—2    V wherein

Y represents H or an alkali or alkaline earth metal cation, preferably $Na^{\oplus}$; and $R_2$ has the above indicated meanings;

d. a pyridine derivative of formula VI, as set out below, or a salt thereof is treated with a reducing agent or, if desired, with a nucleophilic reagent, particularly a base:

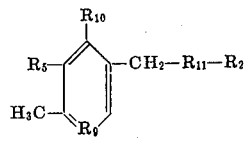   VI wherein $R_9$ is

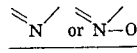

$R_{10}$ represents —CH$_2$R$_6$ or a free or functionally modified formyl group; and $R_{11}$ is —S—,

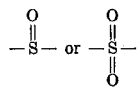

with the provision that $R_9$ is always

when $R_{10}$ is —CH$_2$R$_6$ and $R_{11}$ is —S—; and that $R_{10}$ is always a free or functionally modified formyl group when $R_9$ represents

and $R_{11}$ represents —S—; and that $R_{11}$ is always

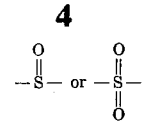

when $R_9$ is

and $R_{10}$ is —CH$_2$R$_6$; and wherein $R_2$, $R_5$ and $R_6$ have the meanings indicated in formula I or III, respectively, and wherein, additionally, undesired substituents may also be present in the residue $R_3$ which undesired substituents can be split off by reduction, or can be converted into the desired substituents for $R_2$ as set forth in the above definition;

e. a pyridoxamine derivative of Formula VII or a salt

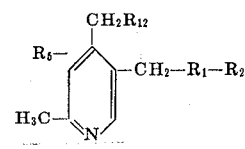   VII wherein $R_{12}$ represents an amino group which is optionally substituted by acyl or triphenylmethyl; and $R_1$, $R_2$ and $R_5$ have the meanings indicated in formula I or III, respectively, is treated with nitrous acid to convert the amino residue $R_{12}$ into a hydroxy group;

f. a 5-thiomethyl-pyridine derivative of the above formula III, wherein X represents H or an alkali or alkaline earth metal cation, is combined by the addition mechanism with alkene or alkyne optionally substituted by halogen, OH, lower alkoxy, SH, lower alkylthio, carboxy, functionally modified carboxy and/or

or g. in a compound of the above formula I or in the salts thereof, containing, however, in the residue $R_2$ undesired substituents, particularly halogen, CO, NO$_2$, NO and/or COOH and/or C—C unsaturated bonds; or not as yet containing desired substituents, especially NH$_2$, N(CH$_3$)$_2$, COOH, SH and/or OH and/or desired C—C unsaturated bonds, the undesired substituents are split off, or the unsaturated C—C multiple bonds are hydrogenated; or the desired substituents and/or C—C unsaturated bonds are introduced.

In addition, it is also possible to split off any remaining protective groups in the residues $R_5$ and $R_6$ after conducting the processes (b) to (g), under the conditions of process (a).

Furthermore, if desirable, the thus-obtained compounds of the above-mentioned formula I wherein $R_1$=—S—, can be oxidized to the corresponding compounds having the substituent

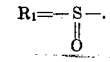

Still further, the free bases of Formula I can be converted into the acid addition, quaternary ammonium or the tertiary sulfonium salts thereof. Conversely, the free bases can be liberated from the acid addition, quaternary ammonium or tertiary sulfonium salts thereof.

In the compounds of Formula I of this invention, the residue $R_1$ represents —S— or

the compounds having the residue $R_1$=—S— being preferred.

The residue $R_2$ is the compounds of formula I can represent the following:

Lower acyl, preferably acyl of a carboxylic acid of up to eight carbon atoms, for example, acetyl, propionyl, butyryl, the acetyl residue being preferred; —$CONR_3R_4$ wherein $R_3$ and $R_4$ being identical or different, represent H or lower alkyl, such as methyl, ethyl, propyl, etc. Preferably, the residues $R_3$ and $R_4$ are identical and represent H or $CH_3$ or $C_2H_5$. The residues $R_3$ and $R_4$ can also be joined to form an alkylene chain of five or six carbon atoms. Interposed in said chain is optionally an N, O or S atom, wherein N $R_3R_4$ represent such rings as piperidino, morpholino, piperazino or thiomorpholino.

The residue $R_2$ can also represent lower unsaturated alkyl, preferably alkenyls, such as vinyl, allyl, propenyl, or butenyl; or alkynyl residues, such as ethynyl or propargyl.

Of special importance, however, are compounds of the above formula I wherein $R_2$ represents an alkyl residue, optionally substituted as indicated in formula I. The alkyl residue can be straight-chain or branched, and generally has no more than 20 carbon atoms. Suitable alkyl residues are long chain alkyls, such as hexyl, heptyl, octyl, dodecyl and lower alkyls such as methyl, n-propyl, isopropyl, n-butyl and isobutyl. Particularly preferred are compounds wherein $R_2$ represents methyl.

An alkyl residue $R_2$ can be monosubstituted, or polysubstituted at any and all carbon positions, but preferably the alkyl is substituted by not more than three substituents. The preferred position for the substitution of the alkyl is the $\omega$-position.

For halogen substitution, Cl and Br are preferred. Additional substituents for the alkyl residue $R_2$ are OH; lower alkoxy, such as methoxy and/or ethoxy, mercapto groups; and/or lower alkylthio groups, particularly methylthio.

Alkyl can also be substituted by amino groups —$NR_3R_4$, wherein $R_3$ and/or $R_4$ represent H or lower alkyl, and wherein alkyl residues $R_3$ and $R_4$ can also be joined together to form an alkylene residue, optionally by way of a nitrogen, oxygen or sulfur atom. Thus, together with the N atom of the amino group, the alkyl residues can form, for example, a piperidino, morpholino, piperazino or thiomorpholino residue. Preferably, the substituents $R_3$ and $R_4$ are identical and represent H or $CH_3$ or $C_2H_5$. Examples of amino-substituted alkyl residues $R_2$ include, but are not limited to: 2-aminoethyl, 3-aminopropyl, 3-amino-2-methylpropyl, 4-aminobutyl, as well as the corresponding N-methyl, N-ethyl, N-propyl, N-butyl, N,N-dimethyl, N,N-diethyl, N-methyl-N-ethyl, and piperidino derivatives. In this connection, particularly preferred is 2-aminoethyl and the corresponding N-mono- and N,N-dimethyl or -ethyl derivatives of this compound.

The alkyl residue $R_2$ can be further substituted by a free carboxy group or a functionally modified carboxy group, in particular by an esterified or amidated carboxy group of a total of up to eight carbon atoms. A suitable esterified carboxy residue is, for example: lower carbalkoxy, such as carbomethoxy, carbethoxy, or also carbobenzoxy. A particularly suitable amidated carboxy reside is —$CONH_2$. However, the hydrogen atoms of the amino group can also be substituted by lower alkyl residues which can be joined with one another, if desired by an additional hetero atom in the same manner as N $R_3R_4$. In addition to the residue —$CONH_2$, also suitable are the N-methyl, N-ethyl, N-propyl, N-butyl, N,N-dimethyl, N,N-diethyl, N,N-dipropyl, N-methyl-N-ethyl amides, as well as the piperidides, piperazides and morpholides or thiomorpholides. Preferred substituents are COOH, $COOC_2H_5$, $CONH_2$, $CON(CH_3)_2$ and $CON(C_2H_5)_2$.

Optionally, it is also possible for the alkyl residue $R_2$ to contain different substituents, for example, $NH_2$ and COOH groups, at the same time. Thus, $R_2$ can represent, for example, an $\omega$-amino-$\omega$-carboxyalkyl residue, e.g.,

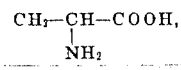

wherein the carboxy group can optionally also be esterified or amidated, or otherwise functionally modified.

Preferred compounds of the above formula I are those wherein $R_2$ represents the following: $COCH_2$, $CONH_2$, $CON(CH_3)_2$, $CON(C_2H_5)_2$, vinyl, propargyl, lower alkyl, especially —$CH_3$ and —$CH(CH_3)_2$ or lower alkyl residue substituted by Cl, Br, $NR_3R_4$, OH, SH, $SCH_3$ and/or COOH (optionally esterified or amidated), especially methyl, substituted by Cl, Br, $NH_2$, $NHCH_3$, $N(CH_3)_2$, $NHC_2H_5$, $N(C_2H_5)_2$, OH, SH, $SCH_3$, COOH, $COOCH_3$ and/or $COOC_2H_5$, and ethyl, substituted by Br, $NH_2$, $NHCH_3$, $N(CH_3)_2$, $NHC_2H_5$, $N(C_2H_5)$, SH, —$SCH_3$, COOH, $COOCH_3$ and/or $COOC_2H_5$.

Among the preferred products of formula I wherein $R_1 = $ —S—, the following examples are set forth:

2-methyl-3-hydroxy-4-hydroxymethyl-5-(methylthiomethyl)-pyridine,
2-methyl-3-hydroxy-4-hydroxymethyl-5-(dimethylcarbamoylthiomethyl)-pyridine,
2-methyl-3-hydroxy-4-hydroxymethyl-5-(vinylthiomethyl)-pyridine,
2-methyl-3-hydroxy-4-hydroxy-methyl-5-(propargylthiomethyl)-pyridine,
2-methyl-3-hydroxy-4-hydroxymethyl-5-(isopropylthiomethyl)-pyridine,
2-methyl-3-hydroxy-4-hydroxymethyl-5-(n-butylthiomethyl)-pyridine,
2-methyl-3-hydroxy-4-hydroxymethyl-5-(hydroxymethylthiomethyl)-pyridine,
2-methyl-3-hydroxy-4-hydroxymethyl-5-($\beta$-mercaptoethylthiomethyl)-pyridine,
2-methyl-3hydroxy-4-hydorxymethyl-5-(methylthioethylthiomethyl)-pyridine,
2-methyl-3-hydorxy-4-hydroxymethyl-5-carbethoxymethylthiomethyl)-pyridine,
2-methyl-3-hydroxy-4-hydroxymethyl-5-($\beta$-aminoethylthiomethyl)-pyridine,
2-methyl-3-hydroxy-4-hydroxymethyl-5-($\beta$-dimethylaminoethylthiomethyl)-pyridine,
2-methyl-3-hydroxy-4-hydroxymethyl-5-($\beta$-amino-$\beta$-carboxyethylthiomethyl)-pyridine.

Additionally, the following compounds are preferred wherein the residue $R_1$ represents

2-methyl-3-hydroxy-4-hydroxymethyl-5-(methylsulfinylmethyl)-pyridine,
2-methyl-3-hydroxy-4-hydroxymethyl-5-(ethylsulfinylmethyl)-pyridine,
2-methyl-3-hydroxy-4-hydroxymethyl-5-(vinylsulfinylmethyl)-pyridine,
2-methyl-3-hydroxy-4-hydroxymethyl-5-(propargylsulfinylmethyl)-pyridine.

In addition to the free bases of the above formula I, the present invention likewise encompasses the salts thereof, i.e., acid addition salts, particularly with strong e.g., acids, such as sulfuric acid or a hydrohalic acid, e.g., hydrochloric acid or hydrobromic acid, and also the quaternary ammonium or tertiary sulfonium salts.

Of particular importance is 2-methyl-3-hydroxy-4-hydroxymethyl-5-methylthiomethyl-pyridine, pharmacologically highly efficacious, and the acid addition salts thereof, e.g. the hydrohalogenides thereof, particularly the hydrochloride or also the sulfate. Among the quaternary ammonium or tertiary sulfonium salts of this compound, the methoidide is especially preferred.

Processes for the preparation of the compounds of this invention will now be described in greater detail:

a. In accordance with one process of the present invention, the compounds of formula I are obtained by liberating hydroxy groups from a starting compound of the above set forth formula II, containing functionally modified hydroxy groups in the 3- and/or 4'-position.

As preferred starting compounds of this embodiment, substances of the above-mentioned formula II are selected wherein $R_5$ and/or $R_6$ represent acyloxy, particularly lower acyloxy, such as acetoxy, propoxy, butoxy, wherein acetoxy is preferred, or $R_5$ and $R_6$ together represent

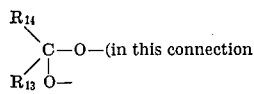

(in this connection $R_{13}$ and $R_{14}$ represent H or lower alkyl, or are together alkylidene or cycloalkylidene or aralkylidene of preferably up to seven carbon atoms, such as methylene, ethylidene, isopropylidene, cyclohexylidene, benzylidene). Furthermore, the residues $R_5$ and $R_6$ can, if desired, also be alkoxy, particularly lower alkoxy, such as $CH_3O—$, $C_2H_5O—$ or $C_3H_7O—$.

In order to liberate the hydroxy group(s), saponifying alkaline reactants or hydrolyzing acid reactants are preferably employed, the latter being more preferred. Thus, acidic reactants are employed, for example, if an alkylidene residue is to be split off from the substituents $R_5$ and $R_6$. In case of acidic hydrolysis, it is possible to liberate OH from a residue $R_5$ or $R_6$, for example, with mineral acids, especially hydrochloric, hydrobromic or sulfuric acid. Also suitable for the acid hydrolysis are, for example, hydrobromic acid/glacial acetic acid, pyridine hydrochloride at an optionally elevated temperature, or Lewis acids, particularly $BF_3$ or $AlCl_3$ in suitable solvents, such as ether or tetrahydrofuran. The acyl groups are split off satisfactorily, for example, by the effect of hydrochloric acid at boiling temperature for about one-half hour. Starting compounds of formula II wherein the substituents $R_5$ and $R_6$ together represent

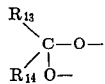

can be liberated even with every dilute acid, e.g., 0.01 $NH_2SO_4$.

If starting substances of formula II are selected wherein $R_5$ and/or $R_6$ represent acylated hydroxy groups (for example,

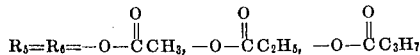

or benzoyloxy) the blocking groups can also be split off by means of alkalis, for example, by means of alkali hydroxide or carbonate, such as sodium or potassium carbonate.

If desired, functionally modified hydroxy and/or amino and/or carboxy groups can likewise be liberated in the side chain $R_2$ in this embodiment.

Preferred starting compounds for this embodiment are, for example, compounds of the above formula II wherein:

These starting compounds can be produced, for example, by alkylation or acylation of a compound according to formula II, having in place of $R_2$, H or $Na^\oplus$, respectively, with a halogen-$R_2$ or an acyl halogenide, respectively, optionally followed by oxidation of the residue

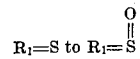

all steps being in accordance with methods known from the literature.

b. For the introduction of the residue $R_2$ into a starting compound of formula III in accordance with the aforementioned mode of operation (b), suitable agents are those conventionally employed for the S-alkylation and S-acylation, respectively, as they are described, for example, in Houben-Weyl, "Methoden der Organischen Chemie" (Methods of Organic Chemistry), 4th Edition, Vol. 9 (1955), Georg Thieme Publishers, Stuttgart, pp. 197 et seq.

Primarily employed for the alkylation are the corresponding reactive esters containing a residue $R_2$, particularly alkyl halogenides or alkyl sulfuric acid esters or alkyl sulfonic acid esters, particularly p-toluenesulfonates. For example, there are employed the corresponding, optionally substituted alkyl chlorides, bromides and iodides, or sulfates of the formula $R_2$—halogen or $(R_2)_2SO_4$, wherein $R_2$ has the above-indicated meanings, such as, for instance, methyl iodide, propyl chloride, butyl bromide, β-chloroethylamine; α-amino-β-chloropropionic acid; β-chloroethyl-mercaptan, dimethyl sulfate, chloroformic acid esters, chloracetic acid esters, allyl bromide, propargyl chloride, methyl p-toluene-sulfonate, propyl bromide or iodide, isopropyl bromide or iodide, sec.-butyl bromide, sec.-butyl iodide, diethyl sulfate, ethyl p-toluenesulfonate, (β-hydroxy)-ethyl p-toluenesulfonate, (β-chloro)-ethyl p-toluenesulfonate, chloracetic acid, bromoacetic acid ester, β-piperidinoethyl chloride and bromide, N-(β-chloro[or -bromo]ethyl)-morpholine, N-(β-chloro[or -bromo]ethyl)-thiomorpholine.

Ethylenimine can also be employed as the alkylating agent for introducing the aminoethyl residue.

Suitable starting compounds of formula III are, e.g.: [3-hydroxy-4-hydroxymethyl-2-methyl-pyridyl(5)-methyl mercaptan, [3-acetoxy-4-acetoxymethyl-2methyl-pyridyl(5)]-methyl mercaptan, and the corresponding mercaptides, particularly the sodium mercaptides. The starting products of formula III are obtainable, for example, by reacting the corresponding 5-halogenomethyl-pyridine compounds with alkali hydrogen sulfide, thiourea or potassium thiocarbonate and, if desired subsequently reacting the product with alkali. Details of these steps are found in the literature, e.g., Houben-Weyl,

 $R_5$ and $R_6$ together represent $CH_3—\underset{\underset{O—}{|}}{\overset{\overset{CH_3}{|}}{C}}—O$ or

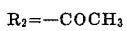 $R_5$ and $R_6$ together represent $(CH_3)_2\underset{\underset{O—}{|}}{C}—O—$ or

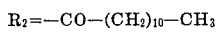 $R_5$ and $R_6$ together represent $(CH_3)_2\underset{\underset{O—}{|}}{C}—O—$ or

 $R_5$ and $R_6$ together represent $\underset{\underset{O—}{|}}{\overset{\overset{C_6H_5}{|}}{CH}}—O—$ or

 $R_5$ and $R_6$ each represents $—O—\overset{\overset{O}{\|}}{C}CH_3$ or 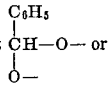

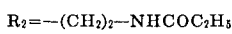 $R_5$ and $R_6$ each represents $—O—\overset{\overset{O}{\|}}{C}C_2H_5$ or

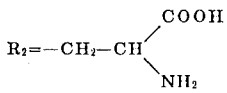 $R_5$ and $R_6$ together represent 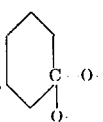

Methoden der Organischen Chemie, 4. edition, Verlag Georg Thieme, Stuttgart, Vol. 9, page 97 ff. (1955).

The starting compounds III are suitably alkylated by combining the reactants in an inert solvent, if desired, under cooling. For example, a mercaptide of formula III is introduced into an aqueous or alcoholic solution, and the alkylating agent, for example an alkyl halogenide or the dialkyl sulfate, is added in an equivalent amount or in a slight excess. The reaction can be conducted at room temperature, by allowing the reaction mixture to stand overnight, for example. If desired, it is also possible to operate at an elevated temperature; for instance, the alkylation can be conducted by heating the mixture for several hours on a steam bath.

In case starting compounds III are present wherein the residues $R_5$ and $R_6$ represent free OH groups, it is advisable not to employ an excess of the alkylating agent in order to avoid an undesired O-alkylation in this manner. Optionally, the mixture is neutralized after the reaction is terminated. The desired final product generally precipitates from the solution during cooling.

It is furthermore possible, for example, to conventionally alkylate a mercaptan III in water or in an alcohol in the presence of an alkali or alkaline earth compound, e.g., an alkali or alkaline earth metal hydroxide, or an alkali metal alcoholate, such as sodium methylate or ethylate—there being at first produced a mercaptide of formula III (X = alkali or alkaline earth metal cation). After the reaction is terminated, the solvent is suitably removed by concentrating the mixture by evaporation, if the alkylation process were conducted in alcohol. Thereafter, the salts contained in the mixture can be removed by treatment with water; the thus-formed final products can be isolated from the residue by extraction with a suitable organic solvent, e.g., ethyl acetate or a chlorinated hydrocarbon, such as chloroform, methylene chloride, trichloroethylene or ether, and evaporation of the extraction agent.

By reaction with an alkylating agent under the aforementioned conditions, it is also possible to exchange, in a starting compound of formula III, an undesired residue X against a desired alkyl residue. By reacting a starting compound III containing an undesired above-defined residue X with, for example, a methyl halogenide, particularly methyl iodide, a compound of the above formula I is obtained, for instance, wherein $R_2=CH_3$. If desired, salts, e.g., sulfonium salts, of the starting compounds III can be employed for this alkylating splitting process.

In case starting compounds III are employed wherein X represents an optionally substituted undesired alkyl residue or also an aryl or aralkyl residue, which can likewise be substituted, the desired residue $R_2$ is introduced by reaction with an alkylating agent under the conditions mentioned above, by transalkylation. Suitable starting compounds for this special modification of process (b) are, for example, compounds of the above-mentioned formula III which contain the substituent $X=-COCH_2C_6H_5$ or $-CH_2-CH=CH_2$ and which can be transalkylated, for example, with $CH_3I$ in a compound I ($R_1=-s-$; $R_2=CH_3$). It is also possible, in starting compounds III containing the residue $X=CH_3$, to replace this residue, e.g., by transalkylation with, for example, $ClCH_2COOH$, by $R_2=CH_{2b}COOH$. The following compounds are exemplary for the starting products:
2-methyl-3-hydroxy-4-hydroxymethyl-5-phenacyl-thiomethyl-pyridine; 2-methyl-3-hydroxy-4-hydroxymethyl-5-benzyl-thiomethyl-pyridine; and 2-methyl-3-hydroxy-4-hydroxymethyl-5-methylthiomethyl-pyridine.

The more specific conditions for the execution of the transalkylation or acylation are described in Houben-Weyl, loc. cit., Vol. 9 (1955), p. 190, or in "Chem. Ber." [Chemical Reports] 83, 90 (1950), 86, 1049 (1953), and "Ann. Chemie" [Annals of Chemistry] 566, 139 (1950).

The starting compounds can be produced, for example, by alkylating a compound of the above formula III under the conditions described above in (b).

In the compounds of formula III, the undesired residue X is removed by treatment with, e.g., an alkyl halogenide, particularly a methyl halogenide, such as methyl bromide or methyl iodide, with the simultaneous introduction of the desired residue $R_2$.

Insofar as starting compounds of the above formula III are employed wherein X represents the residue

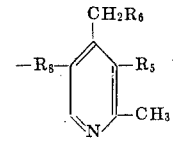

($R_5$, $R_6$ and $R_8$ having the above indicated meanings), there is obtained in this embodiment of the process of this invention the desired final product of the above-mentioned formula I by reaction with an alkylating agent by alkylative splitting. In this alkylative splitting step, in the final analysis, the undesired residue X is likewise substituted by the desired residue $R_2$. For this modification, suitable starting products are, e.g., bis-[2-methyl-3-hydroxy-4-hydroxymethyl-pyridyl-(5)-methyl]-di-(or-mono-) sulfide, or the corresponding tertiary S-alkyl compounds, for instance, the S-methyl compounds (above formula III wherein $R_5$ and $R_5=OH$, $X=$
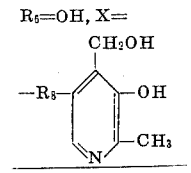

These starting compounds are obtainable, for example, by reacting a compound of formula III ($X=Na^\oplus$) with a compound of formula IV ($Z=Hal$) or a compound of formula IV ($Z=Hal$) with an alkali disulfide, e.g., $Na_2S_2$.

Compounds of formula I wherein the residue $R_2=CH_2OH$ can also be produced from the starting compounds III wherein $X=H$, by reaction with formaldehyde. Suitably, a mercaptan or mercaptide III in an aqueous solution, to which is optionally added an inert organic solvent, particularly alcohol, is mixed for this purpose with an aqueous, preferably 40 percent solution of formaldehyde and allowed to stand several hours, e.g., overnight. In this connection, it is advantageous to employ an excess of formaldehyde.

In order to introduce a residue $R_2=CH_3$ into a starting compound II wherein $X=H$ and $R_5$ and $R_6$ have the above-indicated meanings, a suitable alkylating agent is furthermore diazomethane, in particular. In this reaction, conditions are employed, for example, which are described in "Methoden der praparativen organischen Chemie" [More Recent Methods of Preparative Organic Chemistry], published by W. Foerst, Chemie Publisher, Weinheim (1949), 3rd Edition, Vol. I, pp. 359–412.

A substituent $R_2=$acyl or $-CONR_3R_4$ can be introduced into a starting compound of formula III ($X=H$, alkali or alkaline earth metal cation or undesired acyl residue) by treatment with the conventional acylating agents, or an N-mono- or -di-substituted carbamic acid halogenide.

For the acylation of the starting products III, carboxylic acids can be employed, or the reactive derivatives thereof customarily used for esterification purposes, for example, acid halogenides, particularly acid chlorides, acid anhydrides or also ketenes, in particular symmetrical acid anhydrides. In order to introduce the residue $-CONR_3R_4$, the starting compound III is treated with carbamic acid chlorides, i.e. Cl—CO—$NH_2$ or substituted carbamic acid chlorides, e.g., with carbamic acid chlorides substituted by lower alkyl, such as dimethyl or diethyl carbamic acid chlorides. The conditions for this particular embodiment are described, for instance, in Houben-Weyl, "Methoden der Organischen Chemie" [Methods of Organic Chemistry], 4th Edition, 129 Publishers, Stuttgart, Vol. 9 (1955), pp. 753–756. By reacting a starting product of formula III ($X=H$ or Na) with, for example, an acetyl halogenide, particularly acetyl chloride or bromide, or acetic anhydride, or with a ketene, the acetyl residue can be introduced at the S atom. Besides, an acyl residue $R_2$ can be introduced into a starting compound III (X=H), by making a carboxylic acid react with the available starting product in the presence of a carbodiimide, in particular dicyclohexyl carbodiimide. Preferred are inert solvents which do not contain any active hydrogen, such as, for example, halogenated hydrocarbons, such as $CHCl_3$ or $CH_2Cl_2$, or nitrohydrocarbons, such as nitromethane, or acetonitrile or ethyl acetate.

Furthermore, compounds of the above formula I wherein $R_2$ represents acyl can be converted, by reacting the starting products III (X=H) with a nitrile and hydrochloric acid to the corresponding iminothioether-hydrochloride or with isocyanate to the corresponding thiourethane-S-ester.

The thus-obtained intermediate products are thereafter hydrolyzed to the desired compounds of formula I wherein $R_2$ represents acyl. The procedure followed is, for example, that described in Houben-Weyl, ed. cit., 4th Edition, Vol. 9, pp. 763 et. seq., or 831 et. seq., or 819 et seq. (1955). The iminothioether-hydrochlorides are hydrolyzed, for example, with hydrochloric acid/water.

The acylation is suitably conducted under gentle conditions, insofar as $R_5$ and $R_6$ represent free hydroxy groups in the starting compound III. If $R_5$ and $R_6$ are functionally modified hydroxy groups in the starting compound, it is possible also to operate under more vigorous conditions. In this manner of conducting the process, the OH groups of the starting compounds are preferably blocked.

Starting products of formula III wherein an undesired acyl residue is contained as the substituent X are converted into the desired final products of the above formula I by means of the above-mentioned acylating agents by transacylation.

In the alkylation or acylation process, it is possible to employ, in addition to the basic compounds of the above-disclosed formula III, also the salts thereof, particularly the quaternary ammonium salts and/or optionally sulfonium salts and, in particular, the acid addition salts thereof as the starting compounds.

c. In accordance with the present invention, the starting compound employed can also be a pyridine compound of the above formula IV. The residue $R_2$ is introduced into this compound by reaction with a mercapto compound of the above-mentioned formula V, under approximately the same conditions as described above for the alkylation or acylation, respectively, of the starting product III.

In the starting compounds IV, Z=halogen, preferably bromine or chlorine or a sulfonic acid residue, particularly —$O-SO_2-C_6H_4CH_3$; —$O-SO_2-C_6H_4Br$; —$O-SO_2-C_6H_5$;

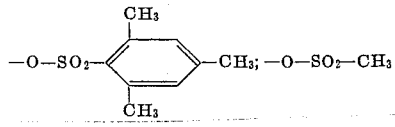

p-toluenesulfonic acid residue being preferred, or the radical of a sulfonic acid ester of the formula

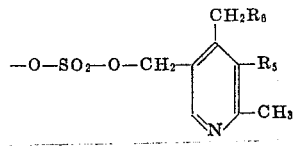

Especially preferred are starting products having the radical Z =halogen, particularly bromine or chlorine.

Suitable starting compounds IV are, for example: 5-chloromethyl-3-hydroxy-4-hydroxymethyl-2-methyl-pyridine; 5 - bromoethyl-3-hydroxy-4-hydroxymethyl-2-methyl-pyridine; 3-acetoxy-4-acetoxymethyl-5-chloro- or -5 -bromomethyl-2-methyl-pyridine, 2-methyl-3-hydroxy-4-hydroxymethyl-5-p-toluenesulfonylmethyl-pyridine, and the acid addition salts thereof, in particular the hydrochlorides, hydrobromides and sulfates of these compounds. The starting compounds IV are obtainable, for instance, by the halogenation of pyridoxine with $COCl_2$, $SOCl_2$, $PCl_3$ or with HBr in accordance with conventional halogenation techniques.

In this mode of operation, the compounds of the above formula I containing the residue $R_2$ = lower acyl are produced by reacting the above-mentioned starting products IV, particularly the corresponding 5-halogenomethyl derivatives, with a thiocarboxylic acid, or a thiocarbamic acid derivative or the corresponding alkali derivatives (above formula V wherein $R_2$ represents lower acyl or $-CONR_3R_4$). This reaction can be conducted, for example, in accordance with the conditions set forth in Houben-Weyl, ed. cit., 4th Edition, Vol. 9 (1955), pp. 749 et seq. Suitably, the reaction is accomplished in an appropriate solvent, e.g., an alcohol, especially a lower aliphatic alcohol, such as methanol, ethanol, propanol, isopropanol and n-butanol, or with dimethyl formamide. A preferred solvent is ethanol. It is advantageous to conduct the reaction in the presence of an alkali, for instance in an alcoholic potassium hydroxide solution. Generally, the process is conducted at room temperature; however, in certain cases, it is preferred to heat the reaction mixture or to boil same under reflux.

In a particularly advantageous embodiment, alcoholic potassium hydroxide solution is provided, for example, in a small excess, and the thiocarboxylic acid is then added; in this reaction, the potassium salt of the acid is formed. Then, either a stoichiometric amount or an excess of the starting compound IV is added to the alkaline solution of the thiocarboxylic acid salt. The thus-obtained compound of formula I is then isolated in a conventional manner, e.g., by extraction with a suitable solvent, such as ether and, optionally, subsequent recrystallization.

In the event the residues $R_5$ and $R_6$ represent free hydroxyl groups in the starting product IV, the thioacylation is suitably conducted under gentle conditions. If $R_5$ and $R_6$ are present in the starting product as functionally modified hydroxy groups, it is possible to operate under more vigorous conditions, for example, at an elevated temperature.

d. Compounds of formula I can also be producted by the reduction of starting compounds of the above-mentioned formula VI or the salts of these compounds.

For example, a starting product of the above-mentioned formula VI containing the substituent

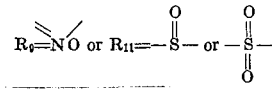

can be converted into the corresponding compounds of formula I containing the pyridine nitrogen in the unoxidized form, or containing the desired residue $R_1$=S, by treatment with reducing agents, such as zinc/dilute hydrochloric acid or iron/hot acetic acid or phosphorus trichloride or bromide. Preferably, the reduction is carried out by heating with ammonium sulfide or heating with phosphorus trichloride, e.g., in chloroform, or by treating with iron powder in hot acetic acid. Likewise, suitable for converting a starting product of Formula VI containing the substituent $R_9$=NO or $R_{11}$=SO or $SO_2$ into a final product I containing the pyridine nitrogen in the unoxidized form, or which contains the desired residue $R_1$=S, is a catalytic reduction with conventional catalysts, e.g., 5 percent palladium charcoal or Raney nickel is suitable solvents, such as ethanol or acetic anhydride. This reduction is conducted under conditions known from the literature, as described, 1954example, in Archiv Pharm. 287, 326 (1954); J. Org. Chem. 18, 534 (1953); Rec. Trav. Chim. Pays-Bas 70, 581 (1951); J. Pharm. Soc., Japan 71, 1092 (1952); Houben-Weyl, "Methoden der Organischen Chemie" 4th Edition, Vol. 11/2, pp. 200 et seq., G. Thieme Publishers, Stuttgart.

In addition to the basic compounds of the above formula VI, salts of these compounds can also be employed as starting compounds in the species (d) of the process of this invention.

Thus, it is possible, for example, to convert salts in accordance with formula VI wherein

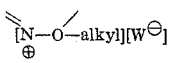

is in place of $R_9$, and

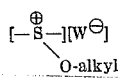

is in place of $R_{11}$ (in this connection, alkyl represents an optionally substituted alkyl residue and $W^\ominus$ represents an equivalent of an anion, such as $Cl^\ominus$, $Br^\ominus$, $I^\ominus$, $\tfrac{1}{2}SO_4''$), likewise by reduction, into the desired compounds I wherein $R_1=—S—$. For this purpose, processes are employed suitable for the reduction of amine-alkoxides to amines or for the reduction of O-alkylated sulfoxides to thioethers, for example, base metals, such as zinc with acids or complex metallic hydrides, such as sodium borohydride in ethyl alcohol or tetrahydrofuran. Furthermore, such salts of compounds VI ($R_{10}=CH_{\omega}{}^R{}_6$) can also be converted, by treatment with nucleophilic reagents, preferably with bases, such as aqueous alkali hydroxide or silver oxide, into the desired compounds of the above Formula I wherein $R_1=—S—$. The conditions under which this special process can be conducted are described, for example, in J. Pharm. Soc. Japan 64, 210 (1944), or J. Org. Chem. 18, 534 (1953), as well as in J. Org. Chem. 32, 1926 (1967) and J. Org. Chem. 32, 3233 (1967).

Furthermore, in the mode of operation (d), starting products VI containing as the substituent $R_{10}$ on the pyridine ring a free or functionally modified formyl group are converted by reduction, in accordance with the processes conventional for the conversion of formyl groups into hydroxymethyl groups, into the desired final products of formula I. Preferred starting compounds for this particular species are compounds of Formula VI wherein $R_{10}$ represents CHO. For example, the following compounds VI can be employed as the starting products: 2-methyl-3-hydroxy-4-formyl-5-methylthiomethyl-pyridine; 2-methyl-3-hdryoxy-4-formyl-5-carbethoxymethylthiomethyl-pyridine; 2-methyl-3-hydroxy-4-formyl-5-aminoethylthiomethyl-pyridine; 2-methyl-3-hyroxy-4-formyl-5-dimethylaminoethylthiomethyl-pyridine. Suitable reduction agents are, e.g. complex metallic hydrides, in particular lithium aluminum hydride or sodium borohydride, base metals and acids, particularly zinc or iron/acetic acid, aluminum amalgam/water, aluminum isopropylate/isopropanol, as well as catalytically activated hydrogen. The more detailed conditions under which the reaction can be conducted are described more explicitly, for example, in Weygand-Hilgetag, pp. 154– 169, Organisch-chemische Experimentierkunst, 3. edition, J. A. Barth-Verlag Leipzig 1964.

Preferred functionally modified formyl groups $R_{10}$ in the starting products VI are acetals of lower alcohols, if desired, also of araliphatic alcohols, such as benzyl alcohol. The conditions for preparing these pyridoxal acetals (compounds VI wherein $R_{10}$ represents, for example, $—CH(OC_2H_5)_2$) are described in detail, for instance in Houben-Weyl, ed. cit., Vol. 6/3 (1965), pp. 199-270. On the pyridoxal acetals, the hydroxyl group in the 5'— position can be substituted by halogen in a manner known from the literature, and the halogen substituent can be replaced by SH or $—R_1—R_2$.

The splitting of these acetals with the simultaneous reduction of the 4'-carbonyl group to the 4'-hydroxy group is preferably conducted with the aid of catalytically activated hydrogen under conditions described in greater detail in Houben-Weyl, ed. cit., Vol. 6/3 (1965), pp. 277-278.

Insofar as substituents are present in the starting compound VI which are reducible in the residue $R_2$, for example, the residues described below under ($g_1$), these residues are optionally also reduced during process (d).

e. A pyridine derivative of the above-mentioned formula VII can be converted into a final product of formula I containing a hydroxy group in the 4'-position, by treatment with nitrous acid. The conditions for this reaction are described, for example, the Houben-Weyl, ed. cit., Vol. 11/2 (1958), pp. 133-157. For this mode of operation, compounds of formula VII or the salts thereof are employed which contain as the substituent $R_{12}$ preferably a free amino group, or an amino group provided with a triphenylmethyl group or with acyl residues, such as o-nitrophenyl sulfenyl, 1-adamantyloxycarbonyl or tert.-butoxycarbonyl. In this connection, starting compounds can be employed, in general, which contain on the amino residue $R_{12}$ acyl residues readily to be split off in acidic media. Optionally, when conducting this mode of reaction, it is also possible to convert an amino group contained in the side chain $R_2$ into a hydroxy group.

The following compounds are set forth as examples for the starting compounds VII:
2-methyl-3-hydroxy-4-amino-methyl-5-methylthiomethyl-pyridine, 2-methyl-3-hydroxy-4-aminomethyl-5-carbethoxymethylthiomethyl-pyridine,
2-methyl-3-hydroxy-4-(o-nitrophenylsulfenyl)-aminomethyl-5-aminoethylthiomethyl-pyridine,
2-methyl-3-hydroxy-4-(1-adamantyloxycarbonyl)-amino-5-acetyl-thiomethyl-pyridine,
2-methyl-3-hydroxy-4-tritylaminomethyl-5-(β-carboxy-β-amino)-ethylthiomethyl-pyridine, and
2-methyl-3-hydroxy-4-(t-butyloxycarbonyl)-aminomethyl-5-chloroethylthiomethyl-pyridine.

The starting compounds of formula VII are obtainable, for instance, by reacting pyridoxamine with 66 percent hydrobromic acid to form 5'-bromopyridoxamine, and further reacting the latter with corresponding halogenides or azides, such as 1-adamantyloxycarbonyl chloride, trityl chloride and o-nitro-sulfenyl chloride in an aqueous solution, or e.g., with t-butyloxycarbonylazide in, for example, 50 percent aqueous dioxane, to the corresponding 5'-bromopyridoxamine substituted in the amino group. This latter compound can then be converted into the desired starting products VII by thioalkylation or thioacylation.

f. It is also possible to prepare a compound of formula I from a 5-thiomethyl derivative of the above-mentioned formula III wherein X=H or an alkali or alkaline earth metal cation, by addition to an alkene or alkyne optionally substituted by halogen, OH, lower alkoxy, SH, lower alkylthio, optionally functionally modified carboxy and/or

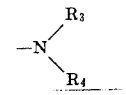

If desired, the compounds III can also be added to alkenes or alkynes containing undesired substituents. The undesired substituents can be split off subsequently, or they can be converted into desired substituents.

Preferably, in this mode of operation of the process according to the invention, the mercapto compounds III are added to unsaturated carbonyl compounds; the carbonyl residue can, if desired, be removed later on, or converted into a desired substituent. Particularly suitable for the addition reaction are α,β-unsaturated carboxylic acids, especially lower α,β-unsaturated carboxylic acid s or the functional derivatives thereof, e.g., the esters or nitriles, such as acrylic acid, methyl acrylate and ethyl acrylate, acrylonitrile, methacrylic acid, methacrylate, methacrylic acid nitrile, crotonic acid, crotonitrile. Furthermore, other α,β-unsaturated carbonyl compounds can also be employed, for example, α,β-unsaturated ketones, such as methylvinyl ketone or α,β-unsaturated aldehydes, such as acrolein, as the addition components.

Additionally, the mercapto compounds can also be added to acetylenically unsaturated hydrocarbons which are optionally substituted in a functionally suitable manner, e.g., acetylene derivative, such as propargyl aldehyde, propargyl alcohol, propargyl halogenides, particularly propargyl chloride and bromide, vinyl acetylene, propargylic acid and the functional derivatives of propargylic acid.

Further addition components which can be employed in conjunction with the mercapto compounds III are also Schiff bases, especially Schiff bases of lower aliphatic aldehydes and lower primary or secondary alkylamines.

Undesired substituents in the alkenes or alkynes employed for the addition reaction can be removed after the addition process, or they can be converted into desirable substituents as described below under (g).

The addition reactions of the mercapto compounds III to alkenes or alkynes are conducted in accordance with the processes set forth in Houben-Weyl, ed. cit., 4th Edition, Vol. 9, (1955), pp. 120–133. When employing this type of operation, compounds of formula I are obtained wherein $R_2$ represents a substituted alkyl residue, optionally defined as in formula I, but containing in the present case at least two carbon atoms.

g. Compounds of formula I or the salts thereof can also be produced by removing, in the residue $R_2$, undesired substituents or converting the latter into desired substituents and/or by hydrogenating undesired C=C double bonds or C≡C triple bonds. Furthermore, it is possible to introduce into a residue $R_2$ any desired substituents and/or C—C unsaturated bonds which may not as yet be present therein.

$g_1$. For example, undesired halogen, hydroxy or carbonyl groups present in the residue $R_2$ can be split off or reduced to H.

The process of cleaving off an undesired halogen, e.g., the conversion of a compound of formula I containing the residue $R_2$=—$CH_2$—halogen, particularly —$CH_2Br$ or —$CH_2Cl$, into the corresponding compound I ($R_2$=$CH_3$), can be conducted by means of the reducing agents conventionally employed for the removal of a halogen, for example, with zinc/dilute hydrochloric acid in an alcoholic solution, or with sodium in alcohols, or with sodium amalgam/water, or with complex metal hydrides, particularly lithium aluminum hydride or sodium borohydride. Halogen can be also removed by catalytic hydrogenation using conventional heavy metal or noble metal catalysts, especially palladium calcium carbonate (2.5 percent palladium content) or palladium charcoal (containing 5 percent of palladium). The conditions for this reduction are described in Weygand-Hilgetag, ed. cit., pp. 169–172, F. Zymalkowski, "Katalytische Hydrierungen im Organisch-Chemischen Laboratorium" [Catalytic Hydrogenations in the Organic-Chemical Laboratory], F. Enke Publishers, Stuggart, 1965, pp. 159–161; Organic Syntheses, Coll. Vol. 4, pp. 509 , Interscience Publishers, New York (1963); N. G. Gaylord, Reductions with Complex Metal Hydrides, Interscience Publishers, New York (1965), pp. 889–917; A Hajos, "Komplexe Hydride" [Complex Hydrides], VEB Deutscher Verlag der Wissenchaften (publisher), Berlin, 1966. pp. 219 and 267.

An undesired hydroxy group in the residue $R_2$ can be removed by reduction with base metals/acids, particularly with zinc/acetic acid or dilute hydrochloric acid, or also catalytically, for instance under the conditions set forth in R. L. Augustine, Catalytic Hydrogenation, Techniques and Applications in Organic Synthesis, Edward Arnold Publishers, London (1965), pp. 135–139; and Weygand-Hilgetag, ed. cit., pp. 177–178.

If desired, the hydroxy group can also be removed after a preceding esterification with a sulfonic acid, particularly p-toluenesulfonic acid. For instance, the conditions can be employed herein as described in L. F. Fieser and M. Fieser, Reagents for Organic Synthesis, p. 1032, J. Wiley & Sons, Inc., New York (1967).

In case an undesired carbonyl group is present in the residue $R_2$—particularly as a component of an aldehyde or keto grouping—such carbonyl group can be reduced in accordance with the methods customary for the reduction of carbonyl groups. A carbonyl group can be reduced, for example, in accordance with the following methods: catalytically, e.g., with platinum oxide or Raney nickel, sodium/absolute alcohol; zinc dust in an acidic or alkaline solution, and complex metal hydrides particularly lithium aluminum hydride in the presence of aluminum chloride. The conditions for this reducing process are described, for example, in Weygand-Hilgetag, ed. cit., pp. 178–181; F. Zymalkowski, "Ketalytische Hydrierungen im Organisch-Chemischen Laboratorium," ed. cit., pp. 158–161; R. L. Augustine, Catalytic Hydrogenation, Techniques and Applications in Organic Synthesis, ed. cit., pp. 135–139; and A. Hajos, "Komplexe Hydride," ed. cit. (1966), pp. 296–306.

The preferred reducing agent is lithium aluminum hydride–aluminum chloride. Optionally, organotin hydrides can also be employed as the reducing agents, particularly diphenyl tin dihydride and di-n-butyl tin dihydride, as well as diphenyl silane and a trialkyl borane. The conditions for this reduction are described for instance, in A. Hajos, "Komplexe Hydride," ed. cit., pp. 288–290.

In addition of hydrogen to undesired unsaturated C—C bonds in the side chain can be accomplished with the air of the catalysts conventionally used for hydrogenation purposes. The more detailed conditions for these reactions are set forth in R. L. Augustine, Catalytic Hydrogenation, ed. cit., pp. 135–139; and F. Zymalkowski, "Katalytische Hydrierungen im Organisch-Chemischen Laboratorium," ed. cit., pp. 158–161.

Likewise, it is possible, if desired, to saturate with hydrogen any C≡C triple bond present in the residue $R_2$, either to the C=C double bond or to the C—C single bond. The conditions therefor are described in greater detail in the above-cited works of R. L. Augustine, pp. 135–139, and F. Zymalkowski, pp. 158–161.

Finally, it is also possible to employ chemical reducing agents for the addition of hydrogen to the undesired unsaturated bonds, e.g., base metals, particularly sodium in alcohols, sodium—or aluminum-amalgam in water, alkali or alkaline earth metals in liquid ammonia, or lithium in organic amines, as described in more detail in Weygand-Hilgetag, ed. cit., pp. 116–126. Complex metal hydrides can as well be employed as the reducing agents, particularly $LiAlH_4$, $NaBH_4$, explained with respect to their use in N. G. Gaylord and Hajos, ed. cit., as well as, in particular, borohydrides, the operating guidelines for these being described in H. C. Brown, Hydroboration, New York (1962).

$g_2$. In the side chain $R_2$ of a pyridine derivative I, it is also possible, if desired, to introduce C—C unsaturated bonds by means of the methods conventional for the formation of C=C double bonds and/or C≡C triple bonds.

For example, a C=C bond can be introduced into the residue $R_2$ containing an undesired hydroxy or alkoxy or halogen group, respectively by splitting off water, alcohol or a hydrohalic acid, respectively from a compound of formula I. If two identical undesired substituents are present on neighboring carbon atoms of the side chain $R_2$, a C≡C bond can be introduced into the side chain $R_2$ by splitting off these undesired substituents.

When splitting off water, the reaction is generally conducted in an aqueous solution with the addition of sulfuric acid, potassium hydrogen sulfate zinc chloride, phosphorus pentoxide, boric acid, oxalic acid, formic acid, acetyl chloride, Grignard reagent, or iodine, and optionally at elevated temperatures. The more detailed conditions under which these reactions can be conducted are set out, for instance, in Weygand-Hilgetag, ed. cit., pp. 782–788.

The removal of the components of a hydrohalic acid is accomplished by the use of inorganic or organic bases such as, e.g., anhydrous alkali alcoholates, solid alkali hydroxides, solutions of alkali hydroxides in water or organic solvents, alkali salts of weak acids, as well as organic bases, such as pyridine, aniline, dimethylaniline and quinoline. The conditions employed in this connection are described, for example Weygand-Hilgetag, ed. cit., pp. 788–790.

If the residue $R_2$ contains an ether grouping in a compound of formula I, e.g., an acetal or ketal, alcohol can be split off, with the formation of a C=C double bond, by the use of specific acidic reactants, e.g., 85 percent phosphoric acid. The conditions which can be employed herein are described in greater detail, for example, in "Organikum," 2nd Edition, VEB Deutscher Verlag der Wissenschaften (publishers), Berlin (1963), pp. 137-203, or in "Annalen der Chemie," Vol. 656, pp. 97-102 (1962).

It is also possible to obtain C=C double bonds in a side chain $R_2$ by splitting off thioethers from a tertiary sulfonium compound in accordance with conventional methods (see, in this connection, S. Patai, The Chemistry of Alkenes, Interscience Publishers, New York (1964), pp. 155 et seq.), particularly by splitting off, for instance, dimethyl sulfide from tertiary sulfonium salts, the third branch of which is the residue $R_2$.

As an example, the following reaction is set forth:

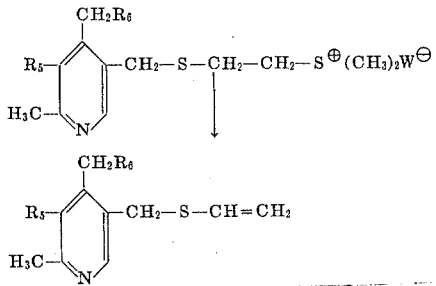

wherein $R_5$, and $R_6$ and $W^\ominus$ have the above-indicated meanings, and in place of $-CH_2-CH_2-$, there can also be present a longer-chain alkylene residue.

Finally, a desired double bond in the side chain $R_2$ can also be introduced by a condensation reaction wherein a compound I with a reactive functional group suitable for the conductance of the condensation reaction reacts with a second compound likewise suitable for the condensation reaction, with the formation of a double bond and simultaneous lengthening of the chain. Suitable for this purpose are primarily aldol, Knoevenagel and Wittig reactions. As the starting substances, compounds of Formula I are employed which, however, contain an undesired C=C group in the side chain $R_2$.

The reaction conditions which can be employed in this connection are described more clearly in: Houben-Weyl, ed. cit., Vol. 7/1 (1954), pp. 76-92, regarding the conductance of the aldol condensation; in G. Jones, the Knoevenagel Condensation in: Organic Reactions, Vol. 15, published by A. C. Cope, J. Wiley & Sons, New York (1967), for the conductance of the Knoevenagel condensation; and in Johnson, Ylid Chemistry, Academic Press, New York (1965) for the conductance of the Wittig reaction.

$g_3$. Halogen residues can be introduced into the side chain $R_2$, in accordance with this invention by the addition of hydrogen halide or halogen to C—C unsaturated bonds, or by the addition of hypohalogenite, there being introduced an OH group together with the halogen, or by halogenation of undesired OH or C=C groups.

The addition of chlorine and bromine to a compound I with an unsaturated side chain $R_2$ is preferably conducted in an inert solvent, particularly carbon tetrachloride or chloroform, by introducing the stoichiometric amount of chlorine gas or adding the stoichiometric quantity of bromine in the same solvent. The conditions under which the reaction can be conducted are described in greater detail, for instance, in Houben-Weyl, ed. cit., Vol. 5/3 (1962), pp. 529-551, and Vol. 5/4 (1960), pp. 38-100. The conditions for the addition of hypohalic acids are found in Houben-Weyl, ed. cit., Vol. 5/3 (1962), pp. 760-780 and Vol. 5.4 (1960), pp. 133-141 or p. 540. The operating conditions for the addition of hydrogen halides are described in greater detail in Houben-Weyl, ed. cit., Vol. 5/3 (1962), pp. 811-829 and Vol. 5/4 (1960), pp. 102-132 and 535.

Halogen residues can also be introduced by the halogenation of compounds of formula I containing undesired OH or C =O groups of the residue $R_2$, by substituting the OH or the oxygen of the C=O group against halogen. For such substitution reactions, a number of reactants can be employed, such as, for example, for the substitution of OH by Cl, sulfur halogenides, such as disulfur dichloride, sulfur dichloride, thionyl chloride, chlorine compounds of phosphorus and nitrogen, such as phosphorus pentachloride, phosphorus tichloride, phosphorus oxychloride, nitrosyl chloride, nitryl chloride, as well as, finally, several other inorganic and organic chloride compounds. This reaction is described in greater detail, for example, in Houben-Weyl, ed. cit., Vol. 5/3 pp. 564 et seq., for chlorine and in Vol. 5/4 of the aforementioned reference pp. 610-629, 638 and 361-409, for bromine and iodine, as well as in Weygand-Hilgetag, ed. cit., pp. 298-323.

The conversion of undesired carbonyl groups into gem-dihalogenides (e.g., 1, 1-dihalogenides), particularly $=CCl_2$ and $=CBr_2$, is effected by the activity of inorganic acid halogenides, particularly phosphorus halogenides, e.g., $PCl_3$ or $PBr_5$. The conditions under which the process can be conducted are explained, for example, in Weygand-Hilgetag, ed. cit., pp. 334-335, or in Houben-Weyl, ed. cit., Vol. 5/3, p. 912 and Vol. 5/4 p. 434.

$g_4$. A hydroxy group can be introduced into the residue $R_2$ of a compound I by the addition of water to undesired C—C unsaturated bonds or by the reduction of C=O groups or free or esterified COOH groups or of an epoxide group, or by the effect of H-acidic compounds on an epoxide bond.

The introduction of a hydroxyl group by the addition of water to C=C double bonds and C≡C triple bonds can be effected, for example, under the conditions described in greater detail in Weygand-Hilgetag, ed. cit., pp. 359-365, as well as in B. A. Krenzel, "Fortschritte der Chemie" [Advances in Chemistry] (Russ.) 20, 759-775 (1951); F. A Asinger, "Chemie und Technologie der Monoolefine" [Chemistry and Technology of the Moonolefins], Akademie Publishers, Berlin (1957); R. A. Raphael, Acetylenic Compounds in Organic Synthesis, Butterworths, London (1955); and F. Bohlmann, "Struktur and Reaktionsfahigkeit der Acetylenbindung" [Structure and Reactivity of the Acetylene Bond], Angew. Chemie [Applied Chemistry] 69, 82-86 (1957).

Furthermore, hydroxy groups in the residue $R_2$ can be formed by the reduction of C=O groups. Suitable reducing agents are the reactants of the Meerwein-Ponndorf-Verley reaction, i.e., aluminum triisopropylate in absolute isopropyl alcohol, as well as complex metal hydrides, particularly LiAlH$_4$ and NaBH$_4$, and base metals together with acids, primarily zinc in acetic acid, as well as, finally, catalytically activated hydrogen, e.g., with the use of platinum oxide, platinum black and other conventional catalysts. The conditions under which the process can be conducted are set out in more detail in Weygand-Hilgetag ed. cit., pp. 154-169, as well as "Neuere Methoden der Praeparativen Organischen Chemie," edited by W. Foerst, Vol. 1, pp. 137-154, Chemie Publishers, Weinheim (Bergstrasse), 3rd Edition, 1949 (Meerwein-Ponndorf-Verley reductions); in A. Hajos, ed. cit., pp. 126, 230, 240 and 279; N. G. Gaylord, ed. cit., pp. 107-124 (reductions with complex hydrides); also in F. Zymalkowski, ed. cit., pp. 91-103; and R. L. Augustine, ed. cit., pp. 85-88 (catalytic hydrogenations of the C=O group to CHOH).

The reduction of a free or suitably functionally modified carboxy group, particularly an esterified carboxy group, in the residue $R_2$ of a compound I can also result in a desired hydroxy group. For conducting such reactions, sodium and an alcohol, e.g., ethyl or amyl alcohol or, particularly, complex metal hydrides, can be employed. The conditions that can be utilized in this connection are described in more detail in Organic Syntheses, ed. cit., Coll. Vol. II, pp. 154 and 372, as well as Coll. Vol. III, p. 671, and in N. G. Gaylord, ed. cit., pp. 322-638, as well as A. Hajos, ed. cit., pp. 158, 258, 285, 298, 310, and 349. Also suitable is a process utilized for the reduction of carboxy groups to OH groups, i.e., catalytic hydrogenation, in particular with copper-chromium oxides (copper chromite) or Raney nickel. In this connection, the process can be conducted according to the conditions set forth in Weygand-Hilgetag, ed. cit., pp. 184–187.

It is also possible to introduce into the residue $R_2$ of a compound I an OH group by the reduction e.g., an epoxide grouping in the residue $R_2$, e.g., with base metals and dilute acids, but especially with complex metal hydrides. More elaborate details for conducting such reactions are described in N. G. Gaylord, ed. cit., pp. 646–673 and A. Hajos, ed. cit., pp. 149–155. It is further possible to split the epoxide ring by compounds containing active hydrogen whereby the ring opening results, with a lengthening of the side chain, in the compounds of this invention having an OH-substituted residue $R_2$. If desired, it is possible during this reaction to additionally introduce other functional groups into the residue $R_2$ at the same time.

For example, by the effect of an alcohol on an undesired epoxide bond in the residue $R_2$ of a compound I, an OH group is formed with splitting of the epoxide ring, with the simultaneous introduction of an alkoxy residue into the substituent $R_2$. Additional suitable reactants for the formation of a hydroxy group from an epoxide bond are mercaptans, amines, carboxylic acids or Grignard reagents.

$g_5$. An alkoxy group can be introduced into the residue $R_2$ of a compound I by the addition of an alcohol to an undesired $C=C$ double bond or $C\equiv C$ triple bond in the residue $R_2$. In this connection, the conditions are utilized set forth in greater detail in Weygand-Hilgetag, ed. cit., pp. 372–376. Optionally, it is also possible to convert a hydroxy group already present in the residue $R_2$ into an alkoxy group, by alkylation under the conditions described in mode of operation (b) above or in Houben-Weyl, ed. cit., Vol. 6/3, pp. 10–49.

$g_6$. An SH or -S-alkyl group can be introduced into the residue $R_2$ in a compound of the above formula I by addition of hydrogen sulfide or a mercaptan to an undesired C—C double or triple bond contained in the residue $R_2$, or by reduction of an undesired sulfur-oxygen function contained in the residue $R_2$—this mode of operation leading to SH groups. More detailed conditions for the addition reaction are described in greater detail in the process (f) above, and in Houben-Weyl, ed. cit., Vol. 9 (1955), pp. 120–134.

In the reduction of an undesired sulfur-oxygen function, i.e., a higher oxidation stage of the sulfur in the residue $R_2$, a starting compound is selected, for example, of formula I, but which contains an $SO_3H$ group, particularly in the esterified form; sulfonic acid halogenide or anhydride residues; or, for instance, a sulfonic acid group $-SO_2H$. Suitable reducing agents include base metals with acids, and especially complex metal hydrides, the use of which is more specifically described in N. G. Gaylord, ed. cit., pp. 851–875.

($g_7$. An optionally alkylated amino group can be introduced into the residue $R_2$ by treating a compound of formula I containing undesired halogen or OH in the residue $R_2$, with ammonia or hexamethylenetetramine or an amine; or by addition of amino compounds to undesired C—C unsaturated bonds; or by the reduction of undesired residues $-CN$, $-NO_2$, $=NOH$, $-NHNH_2$, $-NO$, in the residue $R_2$.

In the reaction with ammonia, hexamethylenetetramine or primary or secondary amines, the conventional conditions of an N-alkylation are observed. Preferably, compounds of formula I are employed as the starting materials which are substituted in the residue $R_2$ by I or also by Br. When introducing an unsubstituted $NH_2$ group, an at least ten-fold excess of ammonia is employed, and the solvents used in this connection are generally alcohols, particularly methanol or ethanol.

The substitution of an undesired halogen by an amino group in the residue $R_2$ of a compound I can also be accomplished with the aid of the Gabriel method with the use of potassium phthalimide. A detailed description of the method used herein is found in Weygand-Hilgetag, ed. cit., pp. 516–529, as well as in Houben-Weyl, ed. cit., Vol. 11/1 (1955), pp. 24–96.

Furthermore, it is possible, in the compounds of formula I in the residue $R_2$, to substitute undesired hydroxy groups by amino, alkylamino or dialkylamino groups. In this connection, conditions are employed which are set out in detail in Houben-Weyl, ed. cit., Vol. 11/1 (1955) pp. 108–236.

If the residue $R_2$ contains undesired C—C unsaturated bonds, particularly in conjunction with respect to activating groups, such as, e.g., the formyl, keto, sulfone, nitro or carbalkoxy group, then it is also possible to produce the amino groups in the residue $R_2$ by the addition to such unsaturated bonds, of suitable components, e.g., ammonia, primary and secondary amines, as well as those of a cyclic character, such as, e.g., piperidine, piperazine or ethylenimine, to these C—C unsaturated bonds. The more specific conditions under which these reactions are carried out are described in greater detail in Houben-Weyl, ed. cit., Vol. 11/1 (1955) pp. 267–341.

Furthermore, an $-N-R_3R_4$ group in the residue $R_2$ can be obtained by reducing a compound of formula I containing additionally in the residue $R_2$ undesired groups reducible to amino, alkylamino or dialkylamino residues, especially $-CN$, $-NO_2$, $-NO$, $=N-OH$ or $-NHNH_2$ groups. In this connection, reducing agents are employed which are conventionally utilized for such reduction processes, in particular sodium amalgam, sodium in alcohol, other base metals, e.g., zinc, with acids, sodium dithionite or complex metal hydrides, more detail being given in Houben-Weyl, ed. cit., Vol. 11/1, pp. 341–730.

$g_8$. A carboxy group can be introduced into the residue $R_2$ of a compound I by oxidation of undesired substituents, particularly formyl groups and primary alcoholic hydroxy groups, or by hydrolysis of a functionally modified COOH group, or by other synthesis methods conventional for the formation of COOH.

Thus, it is possible to introduce a carboxy group into the residue $R_2$ by oxidizing suitable undesired substituents in the residue $R_2$, starting with compounds optionally protected in the 3- and 4'-positions of the pyridine ring. All conventional oxidizing agents can be employed, more detailed conditions being described in Weygand-Hiltetag, ed. cit., pp. 405–407, and in Houben-Weyl, ed. cit., Vol. 8 (1952), pp. 407–414.

If the residue $R_2$ already contains an undesired functionally modified carboxy group, it is possible to liberate therefrom a carboxy group by the use of saponifying agents. Functional derivatives are, in particular, acid nitriles, esters, amides, hydrazides, amidines, the acid halogenides and the hydroxamic acids, and reaction conditions for these conversion reactions are described in greater detail in Houben-Weyl, ed. cit., Vol. 8 (1952), pp. 418–433.

Carboxy groups can also be introduced into the side chain by aceto-ethyl acetate and malonic acid syntheses; by the conversion of ketones; by splitting nitro compounds; by carbon chain formation; and rearrangement reactions, as described in greater detail in Houben-Weyl, ed. cit., Vol. 8 (1952), pp. 433–462.

$g_9$. If desired, free or functionally modified carboxy groups in the residue $R_2$ of a compound I can be further functionally modified.

In particular, free COOH groups or carboxylic acid halogenides can be converted into esters, amides, anhydrides or other functional derivatives. It is also possible to convert esters into amides.

For the esterification of a free COOH group in the residue $R_2$ of a compound I, known processes are employed, including but not limited to, esterification with diazoalkanes, or reaction with alkali alcoholates (Williamson synthesis), additional details being given in Houben-Weyl, ed. cit., Vol. 8 (1952), pp. 508–628.

For amidation, or for the introduction of the other N-derivatives, there are employed reactive function derivatives of the carboxyl group in the residue $R_2$, primarily the esters, anhydrides and halogenides. The conditions under which it is possible to operate when preparing such functional N-derivatives of the carboxy group are described specifically in Houben-Weyl, ed. cit., Vol. 8 (1952), pp. 653–706.

When the products obtained by the above-described processes (b)–(g) have the hydroxy residues R₅ and R₆ still protected, these protective groups are split off subsequent to the main process stages (b) to (g). For liberating these protected hydroxy groups, the conditions are employed as described in mode of operation (a). In this connection, the acidic and/or alkaline agents used for splitting off the protective groups are employed preferably in diluted form.

It is further possible to optionally convert compounds of formula I wherein $R_1$ represents S into the corresponding final products containing the residue

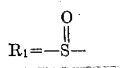

by treatment with oxidation agents conventionally employed for the conversion of thioethers into sulfoxides. Preferred oxidation agents are hydrogen peroxide, sodium metaperiodate, peracids, such as monoperphthalic acid or chromium trioxide in acids, e.g., in 75 percent acetic acid, or t-butyl hypochlorite. The oxidation is suitably conducted under the following conditions:

The compounds I wherein $R_1$=S are dissolved in glacial acetic acid and allowed to stand with the stoichiometric amount of 30 percent $H_2O_2$ several hours at 0° C. or also at room temperature. The oxidation of compounds I wherein $R_1$=S with sodium periodate is advantageously conducted in a water/methanol mixture at room temperature. For the oxidation with peracids, temperatures are employed ranging between about −20° C. and +20° C. and preferred solvents used are acetone or chloroform. The conditions under which the oxidation with t-butyl hypochlorite can be conducted are described in greater detail in J. Org. Chem., Vol. 32(10), 3111 (1967).

A final product of formula I can be converted into the acid addition salt thereof by means of an acid in the usual manner. For this reaction, those acids are suitable which yield physiologically acceptable salts. Thus, suitable acids are, for example, organic and inorganic acids, such as, e.g., aliphatic, alicyclic, araliphatic, aromatic or heterocyclic mono- or polybasic carboxylic or sulfonic acids, including but not limited to, formic, acetic, propionic, pivalic, diethylacetic, succinic, pimelic, fumaric, maleic, lactic, tartaric, malic acid; aminocarboxylic acids; sulfamic, benzoic, salicyclic, phenylpropionic, citric, gluconic, ascorbic, isonicotinic, methanesulfonic, ethanedisulfonic, β-hydroxyethane-sulfonic, p-toluenesulfonic acid; naphthalene-mono- and -disulfonic acids, sulfuric acid, or hydrobromic acid, or phosphoric acids, such as orthophosphoric acid, etc. In this connection, mineral acids are preferred, such as hydrochloric acid or sulfuric acid.

It is also possible, if desired, to convert compounds of formula I into the quaternary ammonium salts thereof and/or the tertiary sulfonium salts thereof. This conversion is conducted with conventional alkylating agents (called in the description below "N,S-dialkylation" and "N- or S-monoalkylation," respectively). The alkylation can be conducted, for example, with alkyl halogenides, preferably with lower alkyl halogenides, in particular the iodides, such as methyl iodide, ethyl iodide, propyl iodide, allyl iodide, or also with benzyl iodide. If desired, it is also possible to subsequently replace an undesired halogenide ion, e.g., I by a desired halogenide ion, e.g., Cl or Br by way of ion exchange techniques well known in the art. Sulfuric acid esters or sulfonic acid esters are likewise suitable for the reaction.

The formation of quaternary ammonium or tertiary sulfonium salts can be conducted in the optional presence of a solvent. Especially suitable solvents are those having a high dielectric constant, such as chloroform or nitro compounds, such as nitrobenzene or nitromethane, or cyano compounds, such as acetonitrile, or if desired, benzyl alcohol. Though the reactions are normally conducted at room temperature, higher temperatures can also be employed.

The rapidly reacting agents used for producing quaternary compounds for example the alkyl iodides, are suitably added in an equimolar proportion; whereas, less reactive alkylating agents, for example an alkyl chloride, are advantageously employed in excess.

If desired, it is also possible to alkylate selectively. For example, the N-alkylation of the compounds of formula I can also be accomplished with less reactive alkylating agents.

Generally, for the production of quaternary ammonium and/or tertiary sulfonium salts of the compounds of formula I, alkylating agents are preferred which contain a lower alkyl residue, particularly a methyl residue. By reacting a compound I wherein $R_1$=S and $R_2$=$CH_3$ with methyl iodide, for example, the compound 2-methyl-3-hydroxy-4-hydroxymethyl-5-methylthiomethyl-pyridinium iodide is obtained.

Aside from the formation of the above salts, a compound of formula I can also be liberated from a corresponding ammonium and/or sulfonium salt. This reaction is effected by the addition of nucleophilic reactants, particularly bases, in an inert solvent, or by the addition of a basic-reacting solvent.

As suitable nucleophilic reactants, bases are preferred, including but not limited to: alkali mercaptides, such as sodium or potassium mercaptides which can optionally be substituted by a hydrocarbon residue, e.g., methyl, ethyl or benzyl, sodium or potassium mercaptide; alkali thiosulfates, such as sodium or potassium thiosulfates; ammonia or amines, particularly aliphatic amines liquid at room temperature, such as ethyl, propyl or benzylamine, and especially ethanolamine. The reaction can be conducted in the optional presence of an inert solvent, including but not limited to, alcohols, particularly lower alcohols, such as methanol, ethanol, propanol, isopropanol; or acetone; or methyl ethyl ketone.

Further details of reaction conditions are found, for example, in Houben-Weyl, ed. cit., Vol. 11/1(1957), pp. 966–991, and in "Chemische Berichte" [Chemical Reports], Vol. 90, 395 and 403 (1957).

Similarly, it is also possible to liberate a compound of formula I from an undesired acid addition salt by treatment with an alkaline reagent, especially an alkali hydroxide, such as sodium or potassium hydroxide, or with an alkaline-reacting salt, such as an alkali carbonate, e.g., sodium or potassium carbonate. If desired, this liberated compound of formula I can then again be converted into another desired acid addition salt.

The compounds of formula I can be employed in a mixture with conventional pharmaceutical excipients and, if desired, together with other active substances. Carrier substances can be such organic or inorganic substances suitable for parenteral, enteral, or topical application, and which, of course, do not deleteriously react with the novel compounds, such as, for example, water, vegetable oils, polyethylene glycols, gelatin, lactose, amylose, magnesium stearate, talc, Vaseline, cholesterol, etc.

For parenteral application, particularly suitable are solutions, preferably oily or aqueous solutions, as well as suspensions, emulsions, or implants. Ampoules are convenient unit dosages.

For enteral application, particularly suitable are tablets or dragees which are also characterized by talc and/or a carbohydrate carrier or binder or the like, the carbohydrate carrier being preferably lactose and/or corn starch and/or potato starch. A syrup or the like can also be used wherein a sweetened vehicle is employed.

For topical application, viscous to semisolid forms are used such as liniments, salves, or creams, which are, if desired, sterilized, or mixed with auxiliary agents, such as preservatives, stabilizers, or wetting agents, or salts for influencing the osmotic pressure, or with buffer substances.

The compounds of this invention are administered to animals, e.g., mammals, in therapeutically effective amounts, e.g., amounts effective to increase animal tolerance to oxygen deficiency, in preferred dosages of 1–500 mg. per dosage unit, the dosage per kg. ratio being about 0.1 to 7 mg. per kg. In general, the amount of carrier varies from 1–5,000 mg. and the preferred dosage is about 100 mg. active compound.

Aside from the details of how to use the compounds of this invention, as previously set forth, they can be used, generally speaking, in the same manner as the known cysteine, used as protective substance against high intensity radiation or the known bis-(3-hydroxy-4-hydroxymethyl-2-methyl-pyridyl-(5)-methyl)-disulfide used as effective compound for curing cerebral disfunctions.

The protective effect against high intensity radiation may be evaluated with the method, published in "Strahlentherapie," Volume 107, (1958) page 121–126. The curing effect for combatting cerebral disfunctions may be evaluated for example with the methods published in Medicina Experimentalis, Vol. 7, (1962) pages 144–154 and Deutsche Zeitschrift fuer Nervenheilkunde, Vol. 188, (1966), p. 200–209.

The administered dosages of the compounds according to the invention are about the same as those which are generally administered for cysteine or bis-(3-hydroxy-4-hydroxymethyl-2-methyl-pyridyl-(5)-methyl)-disulfide.

Without further elaboration, it is believed that one skilled in the art can, using the preceding description, utilize the present invention to its fullest extent. The following preferred specific embodiments are, therefore, to be construed as merely illustrative, and not limitative, of the remainder of the specification and claims in any way whatsoever.

EXAMPLE 1

Eleven g. of 5-hydroxy-4-hydroxymethyl-3-mercaptomethyl-6-methyl-pyridine hydrochloride is added to a solution of 6.2 g. KOH in 100 ml. of methanol, and mixed with 7 g. of methyl iodide. After allowing the reaction solution to stand overnight, it is concentrated, mixed with water, and extracted with ethyl acetate. The solution is dried over $Na_2SO_4$, and the solvent is evaporated. The residue, consisting of 5-hydroxy-4-hydroxymethyl-3-methylthiomethyl-6-methyl-pyridine after recrystallization from alcohol, melts at 135° C. Yield: 8.7 g. of hydrochloride, m.p., 155° C. (decomposition).

EXAMPLE 2

In a solution of 1,000 ml. of water and 250 ml. of 2N NaOH, 110 g. of 5-hydroxy-4-hydroxymethyl-3-mercaptomethyl-6-methyl-pyridine hydrochloride is dissolved and, under stirring, 63 g. of dimethyl sulfate and 250 ml. of 2N NaOH are added dropwise at the same time so that the pH of the solution is between 7 and 7.5. The temperature of the solution ranges between 20° C. and 25° C. After 5 hours of agitation, the precipitated 5-hydroxy-4-hydroxymethyl-3-methylthiomethyl-6-methyl-pyridine is vacuum filtered and, after being dried in a desiccator, is treated with alcoholic HCl. The thus-precipitated hydrochloride is vacuum filtered and recrystallized from alcohol/ether; m.p. 154°–155° C. (decomposition).

EXAMPLE 3

Twenty g. of methyl p-toleunesulfonate is dissolved in 220 ml. of methanol containing 8 g. of NaOH, then mixed with 22 g. of 5-hydroxy-4-hydroxymethyl-3-mercaptomethyl-6-methyl-pyridine hydrochloride and allowed to stand for 12 hours at room temperature. The solution is concentrated under vacuum, mixed with water, and extracted with ethyl acetate. The solution is dried over $Na_2SO_4$, and the residue obtained after the solvent has been evaporated is treated with alcoholic HCl. The thus-precipitated 5-hydroxy-4-hydroxymethyl-3-methylthiomethyl-6-methyl-pyridine hydrochloride is vacuum filtered and recrystallized from alcohol/ether; m.p., 154°–155° C. (decomposition).

EXAMPLE 4

To a solution of sodium mercaptide in methanol (produced by the introduction of $CH_3SH$ into a solution of 2.3 g. of sodium in 40 ml. of methanol), a solution of 18.7 g. of 3-chloromethyl-5-hydroxy-4-hydroxymethyl-6-methyl-pyridine in 200 ml. of methanol is slowly added and then refluxed for ½ hour. The NaCl which separates is vacuum filtered, and the filtrate is concentrated by evaporation. The residue is treated with alcoholic HCl, and the thus-precipitated 5-hydroxy-4-hydroxymethyl-3-methylthiomethyl-6-methyl-pyridine hydrochloride is vacuum filtered; m.p. 153°–154° C. (decomposition).

EXAMPLE 5

A solution of 0.5 g. of sodium in 50 ml. of isopropanol is mixed with 2.3 g. of dimethyl aminoethyl mercaptan and thereafter with 5 g. of 3-bromomethyl-5-hydroxy-4-hydroxymethyl-6-methyl-pyridine. After heating the reaction mixture for 1 hour to 60° C., the thus-precipitated NaBr is vacuum filtered, and HCl is introduced into the filtrate until a weakly acidic reaction is obtained. After adding 5 ml. of ether, the 3-dimethylaminoethylthiomethyl-5-hydroxy-4-hydroxymethyl-6-methyl-pyridine dihydrochloride precipitates. The substance is vacuum filtered and recrystallized from methanol/ether; m.p., 200° C. (decomposition).

EXAMPLE 6

To a solution of 1.2 g. of sodium in 100 ml. of isopropanol, 9.2 g. of 5-hydroxy-4-hydroxymethyl-3-mercaptomethyl-6-methyl-pyridine and 7 g. of n-butyl bromide are added. After refluxing the reaction mixture for 1½ hours, it is vacuum filtered from the precipitated NaBr, and HCl is introduced into the filtrate. The thus-precipitated 3-n-butylthiomethyl-5-hydroxy-4-hydroxymethyl-6-methyl-pyridine hydrochloride is then vacuum filtered and redissolved from alcohol/ether; m.p., 124° C.

EXAMPLE 7

A solution of 35 g. of cysteine · HCl · $H_2O$ in 50 ml. of water is heater to 40° C. Simultaneously, there are added 37.5 g. of 3-chloromethyl-5-hydroxy-4-hydroxymethyl-6-methyl-pyridine in batches and a solution of 22.4 g. of KOH in 30 ml. of water. During this reaction step, the temperature increases to 68° C. After 40 minutes, the reaction mixture is cooled, and the thus-precipitated residue is vacuum filtered. For purification purposes, this precipitate is dissolved in 80 ml. of 2N HCl and the pH of the solution is adjusted to 5.5 by means of 2N NaOH. The S-[5-hydroxy-4-hydroxymethyl-6-methyl-pyridyl-(3)-methyl]-cysteine precipitated overnight is vacuum filtered, washed with water and methanol, and dried in a desiccator; m.p., 230° C. (decomposition).

EXAMPLE 8

A solution of 22 g. of 5-hydroxy-4-hydroxymethyl-3-mercaptomethyl-6-methyl-pyridine hydrochloride in 20 ml. of water is mixed with 10 ml. of 35 percent formaldehyde solution. The 5-hydroxy-4-hydroxymethyl-3-hydroxymethylthiomethyl-6-methyl-pyridine hydrochloride precipitated after allowing the reaction mixture to stand for 12 hours is vacuum filtered and recrystallized from methanol; m.p., 157° C.

EXAMPLE 9

9.2 g. of 5-hydroxy-4-hydroxymethyl-6-methyl-3-mercaptomethyl-pyridine is dissolved in 50 ml. of IN NaOH and mixed in batches, with shaking, with 5 g. of dimethylcarbamic acid chloride. After standing overnight, the separated S-[5-hydroxy-4-hydroxymethyl-6-methyl-pyridyl-(3)-methyl]-thioformic acid dimethylamide is vacuum filtered and recrystallized from alcohol; m.p., 188° C.

EXAMPLE 10

Analogously to example 6, S—[5-hydroxy-4-hydroxymethyl-6-methyl-pyridyl-(3)-methyl]-thioacetic acid ethyl ester is produced by reacting 5-hydroxy-4-hydroxymethyl-3-mercaptomethyl-6-methyl-pyridine with ethyl chloroacetate; m.p. 96° C. (alcohol); hydrochloride, m.p., 175° C. (alcohol/ether).

EXAMPLE 11

Analogously to example 1, 3-allylthiomethyl-5-hydroxy-4-hydroxymethyl-6-methyl-pyridine is prepared by reacting 5-hydroxy-4-hydroxymethyl-3-mercaptomethyl-6-methyl-pyridine hydrochloride with allyl bromide; m.p., 111° C. (ethyl acetate/hexane); hydrochloride, m.p., 136° C.

EXAMPLE 12

Analogously to example 1, 5-hydroxy-4-hydroxymethyl-6-methyl-3-propargylthiomethyl-pyridine is produced by reacting 5-hydroxy-4-hydroxymethyl-3-mercaptomethyl-6-methyl-pyridine with propargyl chloride; m.p., 140° C. (ethyl acetate/hexane); hydrochloride, m.p., 135° C.

EXAMPLE 13

1.4 g. of 5-hydroxy-4-hydroxymethyl-3-methylthiomethyl-6-methyl-pyridine hydrochloride is allowed to stand in 30 ml. of glacial acetic acid with 0.8 ml. of 30 percent $H_2O_2$ at room temperature for 48 hours. The solvent is evaporated under vacuum, and the thus-precipitated 5-hydroxy-4-hydroxymethyl-3-methylsulfinylmethyl-6-methyl-pyridine hydrochloride is recrystallized from alcohol/ether; m.p., 179° C.

EXAMPLE 14

To a solution of 23.5 g. of sodium metaperiodate in 200 ml. of water cooled to 0° C. is added 21 g. of 3-ethylthiomethyl-5-hydroxy-4-hydroxymethyl-6-methyl-pyridine in 50 ml. of methanol. The precipitated substance is vacuum filtered, and the filtrate extracted with ethyl acetate. The solvent is dried over $Na_2SO_4$ and evaporated under vacuum. The residue is treated with alcoholic HCl; the thus-precipitated 3-ethylsulfinylmethyl-5-hydroxy-4-hydroxymethyl-6-methyl-pyridine hydrochloride is vacuum filtered and recrystallized from alcohol/ether; m.p., 143° C.

EXAMPLE 15

6.6 of 5-hydroxy-4-hydroxymethyl-3-methylthiomethyl-6-methyl-pyridine is mixed, in a mixture of 50 ml. of tetrahydrofuran and 80 ml. of acetone, at −10 to −15° C., with a solution of 6.1 g. of monoperphthalic acid in 180 ml. of ether, cooled to −15° C. After 24 hours, the solvent is removed by evaporation. The residue is extracted with chloroform and filtered off from undissolved phthalic acid. The residue obtained after the chloroform has been evaporated is treated with alcoholic HCl; the thus-precipitated 5-hydroxy-4-hydroxymethyl-3-methylsulfinylmethyl-6-methyl-pyridine hydrochloride is vacuum filtered and recrystallized from alcohol/ether; m.p. 178°–179° C.

EXAMPLE 16

Five g. of 5-hydroxy-4-hydroxymethyl-3-methylthiomethyl-6-methyl-pyridine is heated in 30 ml. of 75 percent acetic acid to 80° C.; thereafter, a solution of 2 g. of $CrO_3$ in 6 ml. of water is added dropwise. The temperature of the reaction mixture is maintained at 70°–80° C. for 1 hour. Then, the mixture is concentrated under vacuum, mixed with water, and continuously extracted with ethyl acetate. The ethyl acetate extract is dried over $Na_2SO_4$, concentrated by evaporation, and the residue treated with alcoholic HCl. The thus-precipitated 5-hydroxy-4-hydroxymethyl-3-methylsulfinyl-methyl-6-methyl-pyridine hydrochloride is vacuum filtered and recrystallized from alcohol/ether; m.p. 179° C.

EXAMPLE 17

Analogously to example 13, 3-allylsulfinylmethyl-5-hydroxy-4-hydroxymethyl-6-methyl-pyridine hydrochloride is produced by reacting 3-allylthiomethyl-5-hydroxy-4-hydroxymethyl-6-methyl-pyridine hydrochloride with 30 percent $H_2O_2$; m.p., 140° C. (decomposition) (alcohol/ether).

EXAMPLE 18

Analogously to example 13, 5-hydroxy-4-hydroxymethyl-6-methyl-3-propargylsulfinylmethyl-pyridine hydrochloride is prepared by reacting 5-hydroxy-4-hydroxymethyl-6-methyl-3-propargylthiomethyl-pyridine hydrochloride with 30 percent $H_2O_2$; m.p., 158° C. (decomposition) (methanol/ether).

EXAMPLE 19

Nine g. of 2-methyl-3-hydroxy-4-hydroxymethyl-5-mercaptomethyl-pyridine is dissolved in an excess of acetic anhydride; several ml. of anhydrous pyridine are added; and the reaction mixture is allowed to stand overnight in a cooled water bath. The thus-cooled reaction product is mixed with water, acidified to a pH of 2–3, and heated for 30 minutes to 60°–80 C. After cooling, the aqueous phase is extracted with ether in an extractor. The dried ether solution is freed of the solvent by allowing an appropriate amount of boiling absolute alcohol to flow into the solution. HCl is introduced into the cooled, alcoholic solution, and after standing overnight, 2-methyl-3-hydroxy-4-hydroxymethyl-5-acetylthiomethyl-pyridine hydrochloride is crystallized from the reaction mixture. Yield: 85 percent of theory. M.p.: 160° C. after recrystallization from alcohol-ether.

EXAMPLE 20

In a round flask, 9.24 g. of isopropylidene-5′-thiopyridoxine is dissolved in 200 ml. of ether and mixed with an ether-diazomethane solution until the yellow color persists. After 1 hour, the excess of diazomethane is removed by the dropwise addition of dilute acetic acid, and the solvent is thereupon evaporated. The residue is mixed with 100 ml. of 0.0N hydrochloric or sulfuric acid or another mineral acid and heated on a steam bath for 30 minutes. After cooling, the reaction mixture is extracted several times with ethyl acetate, dried, the solvent removed by evaporation, and the remaining substance mixed with HCl-saturated, dry alcohol. When allowing the reaction mixture to stand overnight, 2-methyl-3-hydroxy-4-hydroxymethyl-5-methyl-thiomethyl-pyridine hydrochloride crystallizes. Yield: 87 percent of theory; m.p., 155° C.

EXAMPLE 21

A solution of 1.7 g. of lauric acid chloride in 5 ml. of chloroform is added dropwise to a solution of 2.0 g. of isopropylidene-5′-thiopyridoxine HCl in 20 ml. of chloroform and 10 ml. of pyridine. After allowing the reaction mixture to stand overnight, it is first washed with water in a separatory funnel and then with 0.5N HCl The separated chloroform phase is dried and concentrated by evaporation. The oily residue (2g.) is boiled under reflux with 20 ml. of water, 40 ml. of alcohol and 8 ml. of N HCl for 10 minutes, and then freed of the solvent under vacuum. The residue crystallizes upon treatment with isopropyl ether. After recrystallization from ethyl acetate/alcohol, the 2-methyl-3-hydroxy-4-hydroxymethyl-5-laurylthiomethyl-pyridine melts at 118°–119° C. By stirring together with alcoholic HCl the hydrochloride is obtained, m.p., 125° C.

EXAMPLE 22

Eleven g. of 2-methyl-3-hydroxy-4-hydroxymethyl-5-thiomethyl-pyridine hydrochloride is added to a solution of 6.2 g. of potassium hydroxide in 150 ml. of methanol, and then mixed with 8.5 g. of β-methylthioethyl bromide. The reaction mixture is heated for 2 hours in a steam bath and substantially freed of the solvent. The residue is extracted with ethyl acetate. The combined ethyl acetate phases are dried over sodium sulfate and then removed by evaporation. After mixing with alcoholic hydrochloric acid, and allowing the reaction mixture to stand overnight, 2-methyl-3-hydroxy-4-hydroxymethyl-5-($\beta$-methylthioethylthiomethyl)-pyridine crystallizes as the hydrochloride.

EXAMPLE 23

In the course of one hour, a cooled solution of 6.1 g. of ethylene sulfide in alcohol is added dropwise to a well stirred and ice-cooled solution of 18.5 g. of 2-methyl-3-hydroxy-4-hydroxymethyl-5-thiomethyl-pyridine in a mixture of 2.5 g. of sodium and 200 ml. of absolute alcohol; thereafter, the reaction mixture is stirred at room temperature for another hour. The residue is acidified with acetic acid, and dry hydrogen chloride is introduced, whereupon, after allowing the reaction mixture to stand in a refrigerator overnight, 2-methyl-3-hydroxy-4-hydroxymethyl-5-(thioethylthiomethyl)-pyridine crystallizes.

EXAMPLE 24

Under stirring and ice-cooling, 60 g. of 2-methyl-3-hydroxy-4-hydroxymethyl-5-thiomethyl-pyridine are introduced batchwise into 180 ml. of ethylenimine in such a manner that the temperature does not exceed +10° C. After terminating the addition, the reaction mixture is stirred under cooling for another 2 hours. The thus-precipitated reaction product is vacuum filtered, washed with ether (m.p., of the base: 156°–158° C.) and converted, by suspending the reaction product in alcoholic hydrochloric acid, into the hydrochloride of 2-methyl-3-hydroxy-4-hydroxymethyl-5-($\beta$-amino-ethyl)-thiomethyl-pyridine, which melts at 212° C. after recrystallization from methanol/ether.

EXAMPLE 25

Twenty-two g. of 2-methyl-3-hydroxy-4-hydroxymethyl-5-thiomethyl-pyridine hydrochloride is suspended in 200 ml. of ethanol; under stirring, 12.4 g. of potassium hydroxide is added thereto. The stirring is continued for another hour, and then the reaction mixture is filtered and the filtrate thereafter mixed with 17 g. of isopropyl iodide. After allowing the reaction mixture to stand overnight, it is vacuum filtered from the thus-precipitated potassium iodide. The filtrate is evaporated under vacuum, and the residue dissolved in alcoholic hydrochloric acid. The thus-obtained crude 2-methyl-3-hydroxy-4-hydroxymethyl-5-(isopropylthiomethyl)-pyridine hydrochloride melts, after recrystallization from methanol/ether, at 135°–136° C. Yield: 21 g.

EXAMPLE 26

To a solution of 29 g. of KOH in 300 ml. of methanol, 39.6 g. of thioacetic acid is added. Under ice-cooling, 68 g. of isopropylidene-5'-chloropyridoxine · HCl is then introduced into the solution, and the reaction mixture is allowed to stand overnight. The thus-precipitated potassium chloride is vacuum filtered on a glass frit, and the filtrate evaporated under vacuum. From the filtrate residue, mixed with alcoholic HCl and ether, there crystallizes 70 g. or 96 percent of theory 3,4'-isopropylidene-5-acetylthiomethylpyridoxine as the hydrochloride, m.p., 180° C.

In order to split off the isopropylidene group, the residue of the vacuum evaporation step is mixed with 300 ml. of 0.01N sulfuric acid and heated on a steam bath for 30 minutes. The cooled solution is extracted with ether; the ether solution is dried and then evaporated. The residue of the evaporation is mixed with alcoholic HCl and allowed to stand overnight in a refrigerator. Yield: 76 percent of theory of 2-methyl-3-hydroxy-4-hydroxymethyl-5-acetylthiomethyl-pyridine hydrochloride, m.p., 160° C.

EXAMPLE 27

Eight g. of 2-methyl-3-hydroxy-4-hydroxymethyl-5-methylsulfinylmethyl-pyridine-N-oxide is dissolved in glacial acetic acid; then, with gentle heating on a water bath, 24 g. of zinc dust is introduced into the reaction solution. After the evolution of hydrogen has terminated, the reaction mixture is agitated, with heating to 100° C. for another 24 hours. After cooling, the reaction mixture is filtered off from the excess zinc dust, and the glacial acetic acid is evaporated. The residue is extracted several times with hot absolute alcohol. After cooling and the subsequent introduction of dry hydrogen chloride, 2-methyl-3-hydroxy-4-hydroxymethyl-5-methylthiomethyl-pyridine crystallizes in the form of the hydrochloride; m.p., 155° C. (decomposition).

EXAMPLE 28

18.1 g. of 2-methyl-3-hydroxy-4-(1-adamantyloxycarbonyl)-amino-5-thiomethyl-pyridine is dissolved in 50 percent dioxane. Thereafter, an equivalent amount (5.11 g.) of pivalic acid (2,2,2-trimethylacetic acid) is added, whereupon 10.35 g. of dicyclohexyl carbodiimide, dissolved in 45 ml. of 50 percent dioxane, is added dropwise under stirring. After 4 hours, the reaction mixture is filtered from the thus-separated dicyclohexylurea, and the solvent is removed by evaporation under vacuum at a temperature which is as low as possible. The crude 2-methyl-3-hydroxy-4-(1-adamantyloxycarbonyl)-amino-5-pivalylthiomethyl-pyridine remaining as the residue is taken up in 2N hydrochloric acid, and then 11 g. of sodium nitrite is introduced. After the evolution of nitrogen has ended, the reaction mixture is stirred for another hour at room temperature and then extracted with ethyl acetate. The dried solution is feed of the solvent, and the residue is taken up in ethanolic hydrochloric acid. Upon allowing the reaction mixture to stand overnight in a refrigerator, 2-methyl-3-hydroxy-4-hydroxymethyl-5-pivalylthiomethyl-pyridine hydrochloride crystallizes.

EXAMPLE 29

To a solution of 18.5 g. of 2-methyl-3-hydroxy-4-hydroxymethyl-5-thiomethyl-pyridine in 4 g. of sodium-methylate-containing absolute ethanol, there is added dropwise under stirring within 2 hours 10.1 g. of methyl acrylate in such gradual a manner that, optionally by external cooling, the temperature in the reaction vessel can be maintained at 50° C. ±5° C. After the addition step is terminated, the reaction mixture is additionally heated under stirring for 2 hours at 50° C. in order to complete the reaction. Then, the reaction mixture is cooled, filtered if necessary, and concentrated by evaporation to about one-third of the original volume; then, the solution is saturated with dry hydrogen chloride. The thus-precipitated mixture of sodium chloride and ester hydrochloride is washed with as small an amount of water as possible, to remove the sodium chloride; then, the reaction mixture is recrystallized from alcoholic hydrochloric acid. Thus, the pure 2-methyl-3-hydroxy-4-hydroxymethyl-(5-carbomethoxyethylthiomethyl)-pyridine · HCl is obtained.

EXAMPLE 30

8.7 g. of vinyl acetate is mixed, batchwise and under ice-cooling, with 18.5 g. of 2-methyl-3-hydroxy-4-hydroxymethyl-5-thiomethyl-pyridine. After the reaction mixture is allowed to stand overnight, the reaction mixture is triturated with ether to form a precipitate. The latter is vacuum filtered, washed with ether, and recrystallized from methanol. The thus-obtained 2-methyl-3-hydroxy-4-hydroxymethyl-5-($\beta$-acetoxyethylthiomethyl)-pyridine melts at 224° C.

EXAMPLE 31

Two g. of 2-methyl-3-hydroxy-4-hydroxymethyl-5-methylthiomethyl-pyridine is dissolved in 30 ml. of acetonitrile. The solution is allowed to stand for 3 days with 1.5 g. of methyl iodide and is then filtered off from any precipitate. The filtrate is concentrated. The crystals which separate after allowing the concentrated filtrate to stand overnight in a refrigerator are vacuum filtered and washed with a small quantity of cold methanol. After recrystallization from methanol, the thus-obtained 2-methyl-3-hydroxy-4-hydroxymethyl-5-methylthiomethyl-pyridinium iodide melts at 165° C. Yield: 0.8 g.

The following examples include pharmaceutical compositions of the novel compounds:

EXAMPLE A

Tablets

Each tablet contains

| | |
|---|---|
| 5-hydroxy-4-hydroxymethyl-3-methylthio-methyl-6-methyl-pyridine hydrochloride | 100 mg. |
| lactose | 50 mg. |
| corn starch | 20 mg. |
| magnesium stearate | 2 mg. |

EXAMPLE B

Coated Tablets

Each tablet contains

| | |
|---|---|
| 5-hydroxy-4-hydroxymethyl-3-isopropyl-thiomethyl-6-methyl pyridine | 50 mg. |
| lactose | 70 mg. |
| talc | 2 mg. |

The coating (150 mg.) is a conventional mixture of corn starch, sugar, talc, and tragacanth.

EXAMPLE C

Syrup

A mixture of

| | |
|---|---|
| 5-hydroxy-4-hydroxymethyl-3-methylthio-methyl-6-methyl pyridine | 0.2 kg. |
| glycerol (twice distilled) | 7.5 kg. |
| cane sugar | 56.0 kg. |
| methyl p-hydroxybenzoate | 0.07 kg. |
| n-propyl p-hydroxybenzoate | 0.03 kg. |
| ethanol | 10.0 kg. |
| fruit flavorings | as desired | is prepared and mixed with distilled water in such a manner that the volume of the entire preparation is 100 l. A dosage unit (5 ml.) contains 10 mg. of active substance.

Instead of the hydro chloride, other physiologically compatible acid addition salts of 5-hydroxy-4-hydroxymethyl-3-methyl-thio-methyl-6-methyl-pyridine or the free base or other compounds covered by formula I as well as their physiologically compatible acid addition salts can be incorporated into similar compositions.

The preceding examples can be repeated with similar success by substituting the generically or specifically described reactants and/or operating conditions of this invention for those used in the preceding examples.

From the foregoing description, one skilled in the art can easily ascertain the essential characteristics o of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

The embodiments of the invention in which an exclusive property or privilege is claimed are defined as follows:

1. A member selected from the group consisting of a compound having the following formula and a physiologically acceptable salt thereof, said formula being:

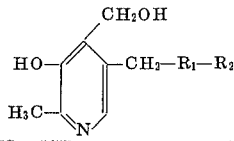

wherein $R_1$ represents $-S-$ or $-\overset{O}{\underset{\|}{S}}-$ $R_2$ represents 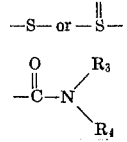

wherein $R_3$ and $R_4$ each represent hydrogen or lower alkyl.

2. A member as defined by claim 1, wherein $R_1$ represents S.

3. A member as defined in claim 1, wherein $R_1$ represents S, and $R_2$ represents

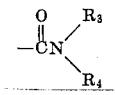

4. A member as defined by claim 3, wherein $R_3$ and $R_4$ each represents lower alkyl.

5. A member as defined by claim 1, wherein $R_2$ represents

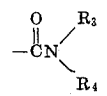

and wherein $R_3$ and $R_4$ represent lower alkyl.

6. A member as defined by claim 1, wherein $R_2$ represents $-CO-N(CH_3)_2$.

7. A member as defined by claim 6, wherein $R_1$ represents S.

8. A member as defined by claim 1, wherein said member is said compound wherein $R_1$ represents S and $R_2$ represents $-CO-N(CH_3)_2$.

* * * * *